United States Patent
Yao et al.

(10) Patent No.: US 9,137,081 B2
(45) Date of Patent: Sep. 15, 2015

(54) SATELLITE NAVIGATIONAL SIGNAL GENERATING METHOD GENERATING DEVICE RECEIVING METHOD AND RECEIVING DEVICE

(71) Applicant: Tsinghua University, Beijing (CN)

(72) Inventors: Zheng Yao, Beijing (CN); Mingquan Lu, Beijing (CN)

(73) Assignee: Tsinghua University (CN)

( * ) Notice: Subject to any disclaimer, the term of this patent is extended or adjusted under 35 U.S.C. 154(b) by 0 days.

(21) Appl. No.: 14/400,506

(22) PCT Filed: Jun. 6, 2013

(86) PCT No.: PCT/CN2013/000675
§ 371 (c)(1),
(2) Date: Nov. 11, 2014

(87) PCT Pub. No.: WO2013/181932
PCT Pub. Date: Dec. 12, 2013

(65) Prior Publication Data
US 2015/0172084 A1    Jun. 18, 2015

(30) Foreign Application Priority Data

Jun. 7, 2012    (CN) .......................... 2012 1 0186757

(51) Int. Cl.
*H04L 5/12*    (2006.01)
*H04L 23/02*    (2006.01)
(Continued)

(52) U.S. Cl.
CPC ............. *H04L 27/2627* (2013.01); *G01S 19/02* (2013.01); *G01S 19/13* (2013.01);
(Continued)

(58) Field of Classification Search
CPC ... H04L 27/2627; H04L 27/2649; H04L 5/06; H04L 5/12; H04L 27/362; H04L 27/366; H04L 5/00; H04L 25/02; H04L 27/26; G01S 19/13; G01S 19/01; H04B 1/707; H04B 1/709
USPC .......... 375/261, 298, 340, 295, 316; 342/352, 342/357.01, 357.06, 357.12
See application file for complete search history.

(56) References Cited

U.S. PATENT DOCUMENTS 6,075,810 A * 6/2000 Raghavan et al. ............. 375/130
6,430,213 B1 * 8/2002 Dafesh .......................... 375/146
(Continued)

*Primary Examiner* — Phuong Phu
(74) *Attorney, Agent, or Firm* — Hamilton DeSanctis & Cha

(57) ABSTRACT

The application relates to the satellite navigation signal, generating method, generating device, receiving method and receiving device. The navigation satellite signal generating device includes a baseband signal generator, a multiplexed signal generator and a modulator. The baseband signal generator is provided to generate a first baseband signal $S_1$, a second baseband signal $S_2$, a third baseband signal $S_3$, and a fourth baseband signal $S_4$. The multiplexed signal generator is provided to set an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope. The modulator is provided to modulate the multiplexed signal with constant envelope to a radio frequency, so as to generate the navigation satellite signal. The first baseband signal $S_1$ and the second baseband signal $S_2$ are modulated to a first carrier frequency $f_1$ with carrier phases orthogonal to each other, and the third baseband signal $S_3$ and the fourth baseband signal $S_4$ are modulated to a second carrier frequency $f_2$ with carrier phases orthogonal to each other.

28 Claims, 7 Drawing Sheets

(51) Int. Cl.
*H04L 27/26* (2006.01)
*H04L 5/06* (2006.01)
*H04L 27/36* (2006.01)
*H04L 5/00* (2006.01)
*H04L 25/02* (2006.01)
*G01S 19/02* (2010.01)
*G01S 19/13* (2010.01)
*H04B 1/707* (2011.01)
*H04B 1/709* (2011.01)

(52) U.S. Cl.
CPC .............. *H04B 1/707* (2013.01); *H04B 1/709* (2013.01); *H04L 5/00* (2013.01); *H04L 5/06* (2013.01); *H04L 5/12* (2013.01); *H04L 25/02* (2013.01); *H04L 27/26* (2013.01); *H04L 27/362* (2013.01); *H04L 27/366* (2013.01)

(56) References Cited

U.S. PATENT DOCUMENTS

| | | | | |
|---|---|---|---|---|
| 7,023,900 | B2* | 4/2006 | Cleveland | 375/146 |
| 7,039,122 | B2* | 5/2006 | Dragonetti | 375/295 |
| 7,120,198 | B1* | 10/2006 | Dafesh et al. | 375/261 |
| 7,154,962 | B2* | 12/2006 | Cangiani et al. | 375/295 |
| 7,505,506 | B1* | 3/2009 | Djuknic et al. | 375/130 |
| 7,948,929 | B1* | 5/2011 | Gilmour et al. | 370/316 |
| 8,774,315 | B2* | 7/2014 | Cahn et al. | 375/297 |
| 2007/0032220 | A1* | 2/2007 | Feher | 455/404.1 |
| 2013/0187809 | A1* | 7/2013 | Rao | 342/357.25 |

* cited by examiner

SATELLITE NAVIGATIONAL SIGNAL GENERATING METHOD GENERATING DEVICE RECEIVING METHOD AND RECEIVING DEVICE

CROSS REFERENCE TO RELATED APPLICATION

The present application claims priority to (is a US National Stage Filing of) PCT Application No. PCT/CN2013/000675 filed Jun. 6, 2013. The aforementioned PCT application claims priority to Chinese Patent Application No. 201210186757.5 filed Jun. 7, 2012. The entirety of each of the two aforementioned references is incorporated herein by reference for all purposes.

TECHNICAL FIELD

The application relates to the field of satellite navigation, and more specifically, the satellite navigation signal, generating method, generating device, receiving method and receiving device.

BRIEF SUMMARY OF THE INVENTION

Figure 1:
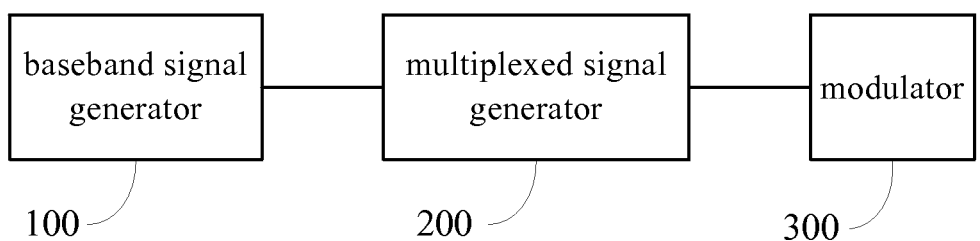
FIG. 1 illustrates a block diagram of navigation satellite signal generating device, according to an embodiment of the present application.

Different embodiments of the present invention provide one or more of a satellite navigation signal, a method for generating a satellite navigation signal, a generating device, a receiving method, a generating device, a receiving device, and/or a receiving method, which can at least partially address the limitations of the aforementioned existing techniques.

In some embodiments of the present invention, a satellite navigation signal generating device is disclosed that includes: a baseband signal generator to generate a first baseband signal $S_1$, a second baseband signal $S_2$, a third baseband signal $S_3$, and a fourth baseband signal $S_4$; a multiplexed signal generator to set an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope; and a modulator to modulate the multiplexed signal with constant envelope to a radio frequency, so as to generate the navigation satellite signal, wherein the first baseband signal $S_1$ and the second baseband signal $S_2$ are modulated to a first carrier frequency $f_1$ with carrier phases orthogonal to each other, and the third baseband signal $S_3$ and the fourth baseband signal $S_4$ are modulated to a second carrier frequency $f_2$ with carrier phases orthogonal to each other.

In various embodiments of the present invention, a satellite navigation signal generating method is disclosed that includes: generating a first baseband signal $S_1$, a second baseband signal $S_2$, a third baseband signal $S_3$, and a fourth baseband signal $S_4$; setting an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope; and modulating the multiplexed signal with constant envelope to a radio frequency, so as to generate the navigation satellite signal, wherein the first baseband signal $S_1$ and the second baseband signal $S_2$ are modulated to a first carrier frequency $f_1$ with carrier phases orthogonal to each other, and the third baseband signal $S_3$ and the fourth baseband signal S4 are modulated to a second carrier frequency $f_2$ with carrier phases orthogonal to each other.

In one or more embodiments of the present invention, a navigation satellite signal is disclosed, which is generated by the aforementioned satellite navigation signal generating method or the navigation satellite generating device.

In some embodiments of the present invention, an apparatus is disclosed that includes a means adapted to process the aforementioned navigation satellite signal, or the navigation satellite signal generated by using the aforementioned satellite navigation signal generating method, or the navigation satellite signal generating device.

In some embodiments of the present invention, a signal receiving device is disclosed, to receive the aforementioned navigation satellite signal, or the satellite navigation signal generated by the aforementioned satellite navigation signal generating method or the navigation satellite generating device.

In various embodiments of the present invention, a signal receiving device to receive the aforementioned navigation satellite signal, or the navigation signal generated by the aforementioned satellite navigation signal generating method or the navigation satellite generating device, is disclosed, which includes: a receiving unit to receive the navigation satellite signal; a demodulation unit to demodulate a signal component modulated on a first carrier of the navigation satellite signal received by the receiving unit, and to demodulate a signal component modulated on a second carrier of the navigation satellite signal received by the receiving unit; and a processing unit to obtain a first baseband signal $S_1$ and a second baseband signal $S_2$ based on the signal component modulated on the first carrier which is demodulated by the demodulation unit, and to obtain a third baseband signal $S_3$ and a fourth baseband signal $S_4$ based on the signal component modulated on the second carrier which is demodulated by the demodulation unit.

In some embodiments of the present invention, a signal receiving method of receiving the aforementioned navigation satellite signal, or the satellite navigation signal generated by the aforementioned satellite navigation signal generating method or the satellite navigation signal generating device, is provided, which includes: receiving the navigation satellite signal; demodulating a signal component modulated on a first carrier of the received navigation satellite signal to obtain a first baseband signal $S_1$ and a second baseband signal $S_2$; and demodulating a signal component modulated on a second carrier of the received navigation satellite signal to obtain a third baseband signal $S_3$ and a fourth baseband signal $S_4$.

In various embodiments of the present invention, a signal receiving device to receive the aforementioned navigation satellite signal, or the satellite navigation signal generated by the aforementioned satellite navigation signal generating method or the satellite navigation signal generating device is disclosed, which includes: a receiving unit to receive the navigation satellite signal; a demodulation unit to demodulate the navigation satellite signal so as to obtain an in-phase baseband component and a quadrature-phase baseband component of the multiplexed signal; and a processing unit to obtain a first baseband signal $S_1$, a second baseband signal $S_2$, a third baseband signal $S_3$ and a fourth baseband signal $S_4$, based on an amplitude and a phase of the in-phase baseband component and an amplitude and a phase of the quadrature-phase baseband component of the multiplexed signal.

In one or more embodiments of the present invention, a signal receiving method of receiving the aforementioned navigation satellite signal, or the satellite navigation signal generated by the aforementioned satellite navigation signal generating method or the satellite navigation signal generating device, is provided, which includes: receiving the navigation satellite signal; demodulating the navigation satellite signal to obtain an in-phase baseband component and a quadrature-phase baseband component of the multiplexed signal; and obtaining a first baseband signal $S_1$, a second baseband signal $S_2$, a third baseband signal $S_3$ and a fourth baseband signal $S_4$, based on an amplitude and a phase of the in-phase baseband component and an amplitude and a phase of the quadrature-phase baseband component of the multiplexed signal.

In one or more embodiments of the present invention, a program is disclosed that includes executable instructions to implement the aforementioned method, device, apparatus, or to generate the aforementioned navigation satellite signal.

In yet other embodiments of the present invention, a machine-readable storage is disclosed, to store the aforementioned program comprising executable instructions to implement the aforementioned method, device, apparatus, or to generate the aforementioned navigation satellite signal.

DETAILED DESCRIPTION

Hereinafter, with reference to the appended drawings, a detailed description on the satellite navigation signals, generating method, generating device, receiving method and receiving device will be presented. For simplicity, in the description of the embodiments of the present application, the same or similar reference numeral is used for the same or similar device.

FIG. 1 illustrates a navigation satellite signal generating device 1 according to an embodiment of the present application. As shown in FIG. 1, the signal generating device 1 includes a baseband signal generator 100, a multiplexed signal generator 200, and a modulator 300. The baseband signal generator 100 generates a first baseband signal $S_1$, a second baseband signal $S_2$, a third baseband signal $S_3$ and a fourth baseband signal $S_4$. The multiplexed signal generator 200 sets an amplitude and a phase of the in-phase baseband component I(t) and an amplitude and a phase of the quadrature-phase baseband component Q(t) of a multiplexed signal of the first baseband signal $S_1$, the second baseband signal $S_2$, the third baseband signal $S_3$ and the fourth baseband signal $S_4$, so as to generate the multiplexed signal with constant envelope. The modulator 300 modulates the multiplexed signal with constant envelope to the radio frequency, so as to generate the navigation satellite signal. In this way, the first baseband signal $S_1$ and the second baseband signal $S_2$ are modulated on a first carrier frequency $f_1$ with orthogonal carrier phases, the third baseband signal $S_3$ and the fourth baseband signal $S_4$ are modulated on a second carrier frequency $f_2$ with orthogonal carrier phases. According to the navigation satellite signal generating device of the present application, it is possible to realize the constant envelope multiplexing of the four signal component $(S_1, S_2, S_3, S_4)$ on the two frequency $(f_1, f_2)$.

According to an embodiment, it is possible to set power parameters $c_1$, $c_2$, $c_3$ and $c_4$ of the baseband signals $S_i$ according to actual requirement. That is, baseband signals may have different power parameters. According to an embodiment, the power parameter may be an absolute power of the baseband signal, such as the actually adopted transmitting power of each baseband signal. According to another embodiment, the power parameter may be a relative power of the baseband signal. As it is understood, the absolute power of a signal changes after passing devices such as amplifier. For instance, when the power ratio: $c_2:C_3:c_4$ of the baseband signals is 1:1:1:1, the relative power of each of the four baseband signals may be 1. When the power ratio $c_1:c_2:c_3:C_4$ of the baseband signals is 1:3:1:3, the relative powers of the four baseband signal may be 1, 3, 1 and 3, respectively. In addition, the baseband signals generated by the baseband signal generator 110 may include one, two or three signals with the power parameter of zero.

The multiplexed signal generator 200 may set the amplitude and phase of the in-phase baseband component and the amplitude and phase of the quadrature-phase baseband component of the multiplexed signal according to the power parameters of the baseband signals.

According to an embodiment, a baseband signal is the signal with value of +/−1. The multiplexed signal generator 200 may set the amplitude and phase of the in-phase baseband component and the amplitude and phase of the quadrature-phase baseband component of the multiplexed signal according to the values of the baseband signals.

Figure 2:
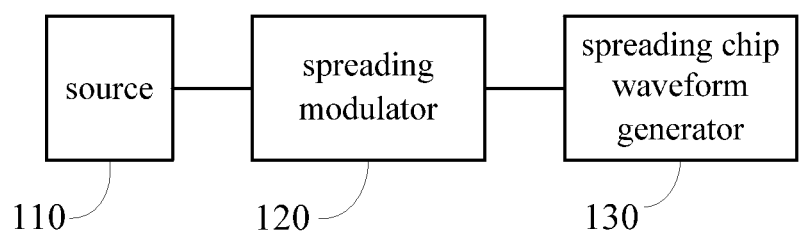
FIG. 2 illustrates a block diagram of baseband signal generator, according to an embodiment of the present application.

As shown in FIG. 2, according to an embodiment, the baseband signal generator 100 may include a source 110, a spreading modulator 120 and a spreading chip waveform generator 130. The source 110 generates the information to be broadcast, such as, synchronization word, time information, ephemeris, etc., which are necessary for the positioning of GNSS, and encodes them into bit stream. As can be understood by those skilled in the art, for some signals exclusively designed for purposes of ranging, such as the pilot channel in GNSS, it is allowed that the bit stream broadcast keeps constantly being 0 or 1 without transmitting specific information.

The spreading modulator 120 modulates the bit stream/information generated by the source through using spreading sequence, so as to obtain the spreading sequence modulated with navigation messages.

The spreading chip waveform generator 130 assigns a waveform to each bit of the spreading sequence with navigation messages. The waveform can be rectangular pulse, Return to Zero waveform, square wave, and the Binary-Coded Symbol (BCS) commonly used in GNSS, etc. It is appreciated by those skilled in the art, the spreading chip waveforms used in the modulations of BPSK-R, BOC, TMBOC, etc. are particular examples of BCS waveform. As can be understood, the navigation satellite signal generating device of the present application allows a flexible choose of the spreading chip waveform used in the baseband signal components.

The output of the spreading chip waveform generator 130 is a baseband signal with value of +/−1. As can be understood by those skilled in the art, the amplitude +/−1 of the baseband signal is not restrictive, and any enlargement or reduction in amplitude of the baseband signal does not depart from the scope of the present application.

According to an embodiment, the multiplexed signal generator 200 may calculate the amplitude and phase of the in-phase baseband component I(t) and the amplitude and phase of the quadrature-phase baseband component Q(t) of the multiplexed signal, based on the power parameters of the baseband signal $S_1$, $S_2$, $S_3$ and $S_4$ and the values of the baseband signal $S_1$, $S_2$, $S_3$ and $S_4$, in order to generate the multiplexed signal with constant envelope.

Figure 3:
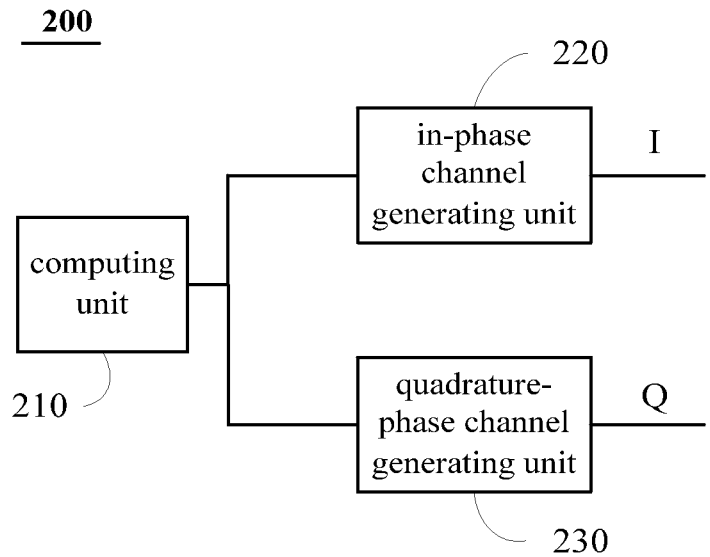
FIG. 3 illustrates a block diagram of multiplexed signal generator, according to an embodiment of the present application.

As shown in the FIG. 3, the multiplexed signal generator 200 may include a computing unit 210, an in-phase channel generating unit 220 and a quadrature-phase channel generating unit 230.

The computing unit 210 calculates the amplitude A(t) and phase $\phi(t)$ of the in-phase baseband component I(t), and calculates the amplitude A'(t) and phase $\phi'(t)$ of the quadrature-phase baseband component Q(t), based on the power parameters and values of the first baseband signal $S_1$, the second baseband signal $S_2$, the third baseband signal $S_3$ and the fourth baseband signal $S_4$.

The in-phase channel generating unit 220 generates the in-phase baseband component I(t), based on the amplitude A(t) and phase $\phi(t)$ calculated by the computing unit 210, wherein the in-phase baseband component I(t) is expressed as:

$$I(t) = A(t) \times sgn[\sin(2\pi f_s t + \phi(t))].$$

The quadrature-phase channel generating unit 230 generates the quadrature-phase baseband component Q(t), based on the amplitude A(t) and phase $\phi(t)$ calculated by the computing unit 210, wherein the quadrature-phase baseband component Q(t) is expressed as:

$$Q(t) = A'(t) \times sgn[\sin(2\pi f_s t + \phi'(t))],$$

where $f_s = |f_1 - f_2|/2$, sgn stands for the sign function, and $$sgn(x) = \begin{cases} +1, & x \geq 0 \\ -1, & x < 0 \end{cases}.$$

As can be understood, in this embodiment, the in-phase baseband component I(t) is a square wave function with the amplitude of A(t), the quadrature-phase baseband component Q(t) is a square wave function with the amplitude of A'(t), and $f_s = |f_1 - f_2|/2$ stands for the frequency of the square wave.

According to an embodiment, the computing unit 210 calculates the amplitude A(t) and phase $\phi(t)$ of the in-phase baseband component I(t), and calculates the amplitude A'(t) and phase $\phi'(t)$ of the quadrature-phase baseband component Q(t) of the multiplexed signal, according to the following equations:

$$A = \sqrt{\left(\sqrt{c_1}\, s_1(t) + \sqrt{c_3}\, s_3(t)\right)^2 + \left(\sqrt{c_2}\, s_2(t) - \sqrt{c_4}\, s_4(t)\right)^2}$$

$$\varphi = -\mathrm{atan2}\left(\sqrt{c_1}\, s_1(t) + \sqrt{c_3}\, s_3(t),\ \sqrt{c_2}\, s_2(t) - \sqrt{c_4}\, s_4(t)\right), \text{ and}$$

$$A' = \sqrt{\left(\sqrt{c_1}\, s_1(t) - \sqrt{c_3}\, s_3(t)\right)^2 + \left(\sqrt{c_2}\, s_2(t) + \sqrt{c_4}\, s_4(t)\right)^2}$$

$$\varphi' = \mathrm{atan2}\left(\sqrt{c_2}\, s_2(t) + \sqrt{c_4}\, s_4(t),\ \sqrt{c_1}\, s_1(t) - \sqrt{c_3}\, s_3(t)\right),$$

where $s_i(t)$, i=1,2,3,4 stands for the i-th baseband signal, with the value of +/−1, $c_i$ stands for the power parameter of the i-th baseband signal $S_i$, and atan 2 is the four-quadrant arctangent function:

$$\mathrm{atan2}(y, x) = \begin{cases} \arccos\left(\frac{y}{\sqrt{x^2+y^2}}\right), & x \geq 0,\ \sqrt{x^2+y^2} > 0 \\ -\arccos\left(\frac{y}{\sqrt{x^2+y^2}}\right), & x < 0 \\ 0, & \sqrt{x^2+y^2} = 0 \end{cases}.$$

As can be understood by those skilled in the art, in the perspective of the time domain, the multiplexed signal generated by the multiplexed signal generator 200 can be expressed as: S(t)=I(t)+jQ(t), where I(t) is the in-phase baseband component of the multiplexed signal, and Q(t) is the quadrature-phase baseband component of the multiplexed signal. The envelope of the multiplexed signal is $E = \sqrt{I^2(t) + Q^2(t)}$. When the envelope of a signal is invariant with time, the signal is termed as a constant envelope signal. According to an embodiment of the present application, the amplitude and phase of the in-phase baseband component I(t) and the amplitude and phase of the quadrature-phase baseband component Q(t) of the multiplexed signal are calculated based on the power parameters of the baseband signals $S_i$ (i=1, 2,3,4) and the values of the baseband signals $S_i$, so as to generate the constant envelope multiplexed signal. In the embodiment, $E = \sqrt{I^2(t) + Q^2(t)} = \sqrt{c_1 + c_2 + c_3 + c_4}$. That is, the envelope of the multiplexed signal does not change with time. Thus, the multiplexed signal is a constant envelope multiplexed signal. As can be understood, in the perspective of the frequency domain, the first baseband signal $S_1$ and the second baseband signal $S_2$ are modulated to the carrier frequency $f_s$ with the carrier phases orthogonal to each other, and the third baseband signal $S_3$ and the fourth baseband signal $S_4$ are modulated to the carrier frequency $-f_s$ with the carrier phases orthogonal to each other, by the mean of the multiplexed signal generator 200.

In addition, the power parameters $c_1$, $c_2$, $c_3$ and $c_4$ of the baseband signal $S_i$ can be set according to the actual requirement. That is, different baseband signals may have different power parameters. Moreover, the baseband signals generated by the baseband signal generator 110 may include one, two or three signals with the power parameter of zero. That is, any one, any two, or any three of the values $c_1$, $c_2$, $c_3$ and $c_4$ may be zero.

According to an embodiment of the present application, the modulator 300 modulates the constant envelope multiplexed signal to a carrier of radio frequency, to generate the navigation satellite signal.

Figure 4:
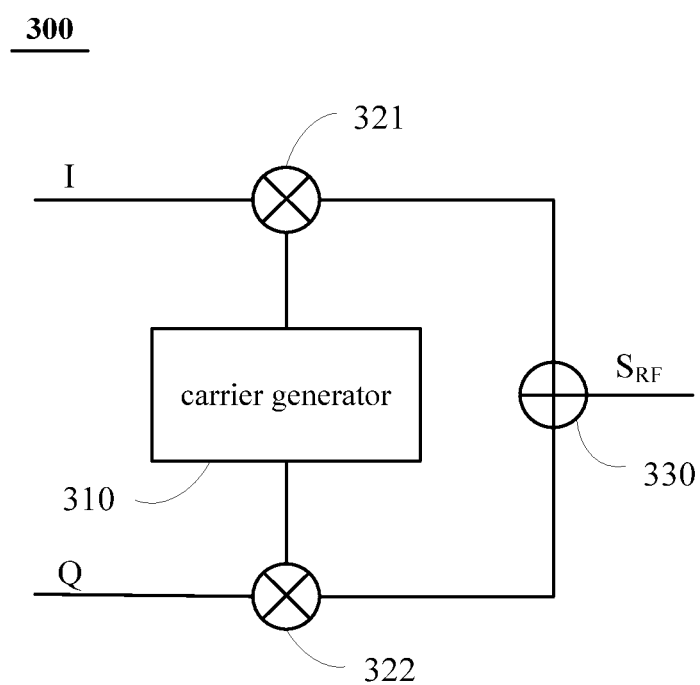
FIG. 4 illustrates a block diagram of modulator, according to an embodiment of the present application.

As shown in FIG. 4, modulator 300 may include a carrier generator 310, a first multiplier 321, a second multiplier 322, and an adder 330. The modulator 300 is used for modulating the multiplexed signal with constant envelope generated by the multiplexed signal generator 200 to the radio frequency and then for transmitting. The carrier generator 310 generates the carrier with a central frequency of $f_{RF}=(f_1+f_2)/2$. By using the first multiplier 321, the in-phase baseband component I(t) of the multiplexed signal generated by the multiplexed signal generator 200 is modulated to the carrier with the central frequency of $f_{RF}$, for example, modulated to the carrier of cos $(2\pi f_{RF}t)$. By using the second multiplier 322, the quadrature-phase baseband component Q(t) of the multiplexed signal generated by the multiplexed signal generator 200 is modulated to the carrier with the central frequency of $f_{RF}$, for example, modulated to the carrier of sin $(2\pi f_{RF}t)$, whose phase is orthogonal to the phase of the carrier modulated by the first multiplier 321. The outputs of the first multiplier 321 and the second multiplier 322 are sent to the adder 330, so as to obtain the navigation satellite signal $S_{RF}$ with constant envelope, where the navigation satellite signal $S_{RF}$ is expressed as:

$$S_{RF}(t)=I(t)\cos(2\pi f_{RF}t)-Q(t)\sin(2\pi f_{RF}t).$$

In this way, the navigation satellite signal $S_{RF}$ transmitted by the satellite is the navigation satellite signal with constant envelope.

Figure 5:
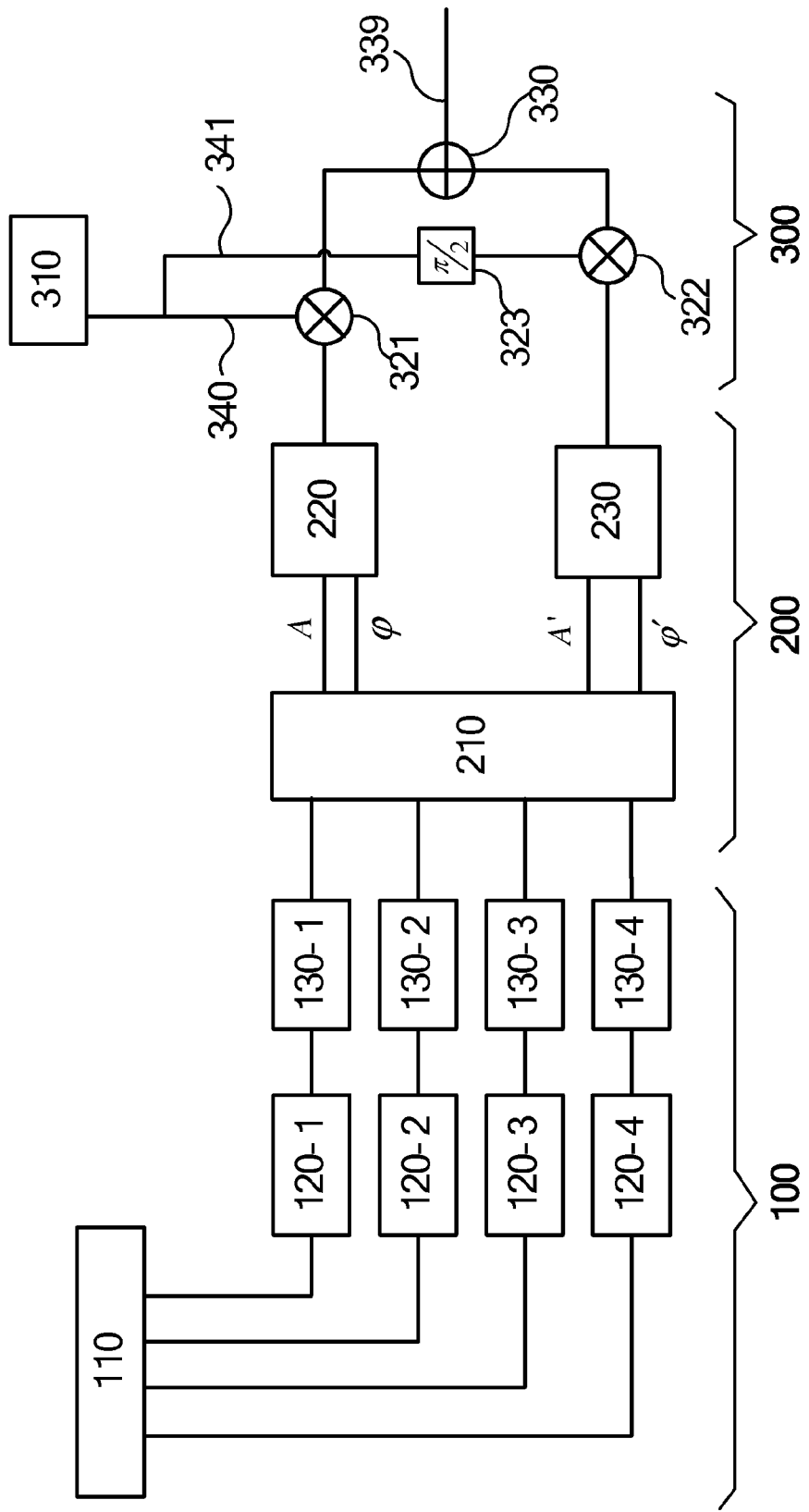
FIG. 5 illustrates a schematic diagram of an implementation of navigation satellite signal generating device, according to an embodiment of the present application.

FIG. 5 illustrates a particular implementation of the navigation satellite signal generating device 1, according to an embodiment of the present application. As shown in FIG. 5, the signal generating device 1 includes a baseband signal generator 100, a multiplexed signal generator 200, and a modulator 300. The baseband signal generator 100 may include a source 110, a spreading modulator 120, a spreading chip waveform generator 130. The multiplexed signal generator 200 may include a computing unit 210, an in-phase channel generator 220, and a quadrature-phase channel generator 230. The modulator 300 may include a carrier generator 310, a first multiplier 321, a second multiplier 322, a π/2 phase shifting circuit 323, and an adder 330.

Specifically, the source 110 generates four binary navigation messages. As can be understood by those skilled in the art, if a pilot channel is used in some implementations, the navigation message of the corresponding channel keeps constant 0 or constant 1. Four navigation messages are transmitted into the spreading modulator 120-1, 120-2, 120-3, 120-4, respectively, for spreading spectral modulation, so as to obtain four spreading sequences with navigation message. The spreading sequences modulated with navigation message are transmitted to the spreading chip waveform generator 130-1, 130-2, 130-3, 130-4. Chip waveforming is made to the input spreading sequence modulated with the navigation message, then the output results can be noted as the baseband signals $s_1(t)$, $s_2(t)$, $s_3(t)$, and $s_4(t)$.

The computing unit 210 receives the baseband signals $s_1(t)$, $s_2(t)$, $s_3(t)$, and $s_4(t)$ from the spreading chip waveform generator 130-1, 130-2, 130-3, 130-4, and then calculates the amplitude A and phase offset φ of the in-phase baseband composite signal, and the amplitude A' and phase offset φ' of the quadrature-phase baseband composite signal, based on the power parameters of the baseband signal $s_1(t)$, $s_2(t)$, $s_3(t)$, $s_4(t)$, and the value $s_1(t)$, $s_2(t)$, $s_3(t)$, $s_4(t)$ at the current time.

The power parameters of the baseband signal $s_1(t)$, $s_2(t)$, $s_3(t)$, $s_4(t)$ may be set as any value according to actual requirements. The calculation rules can be expressed as:

$$A = \sqrt{\left(\sqrt{c_1}\,s_1(t)+\sqrt{c_3}\,s_3(t)\right)^2+\left(\sqrt{c_2}\,s_2(t)-\sqrt{c_4}\,s_4(t)\right)^2}$$

$$\varphi = -\mathrm{atan2}\left(\sqrt{c_1}\,s_1(t)+\sqrt{c_3}\,s_3(t),\sqrt{c_2}\,s_2(t)-\sqrt{c_4}\,s_4(t)\right),\text{ and}$$

$$A' = \sqrt{\left(\sqrt{c_1}\,s_1(t)-\sqrt{c_3}\,s_3(t)\right)^2+\left(\sqrt{c_2}\,s_2(t)+\sqrt{c_4}\,s_4(t)\right)^2}$$

$$\varphi' = \mathrm{atan2}\left(\sqrt{c_2}\,s_2(t)+\sqrt{c_4}\,s_4(t),\sqrt{c_1}\,s_1(t)-\sqrt{c_3}\,s_3(t)\right).$$

The in-phase channel generator 220 receives the amplitude A(t) and phase offset φ(t) of the in-phase baseband composite signal from the computing unit 210, and outputs the in-phase baseband component of the multiplexed signal. That is, the output of the in-phase channel generator 220 can be expressed as $$I(t)=A(t)\times sgn[\sin(2\pi f_s t+\phi(t))]$$

The quadrature-phase channel generator 230 receives the amplitude A'(t) and phase offset φ'(t) of the quadrature-phase baseband composite signal from the computing unit 210, and outputs the quadrature-phase baseband component of the multiplexed signal. That is, the output of the quadrature-phase channel generator 230 can be expressed as $$Q(t)=A'(t)\times sgn[\sin(2\pi f_s t+\phi'(t))].$$

The carrier generator 310 generates a carrier signal at the frequency $f_{RF}$, and the carrier signal is divided into two branches. The carrier signal of the first branch 340 and the output of the in-phase channel generator 220 are input into the first multiplier 321. The carrier signal of the second branch 341, after passing through a π/2 phase shifting circuit 323, turns into a carrier signal with a phase orthogonal to that of the branch 340. The carrier signal of the second branch 341 and the output of the in-phase channel generator 230 are input into the second multiplier 322. The outputs of the two multipliers are input into the adder 330, so as to obtain a navigation satellite signal 339 with constant envelope.

Figure 6:
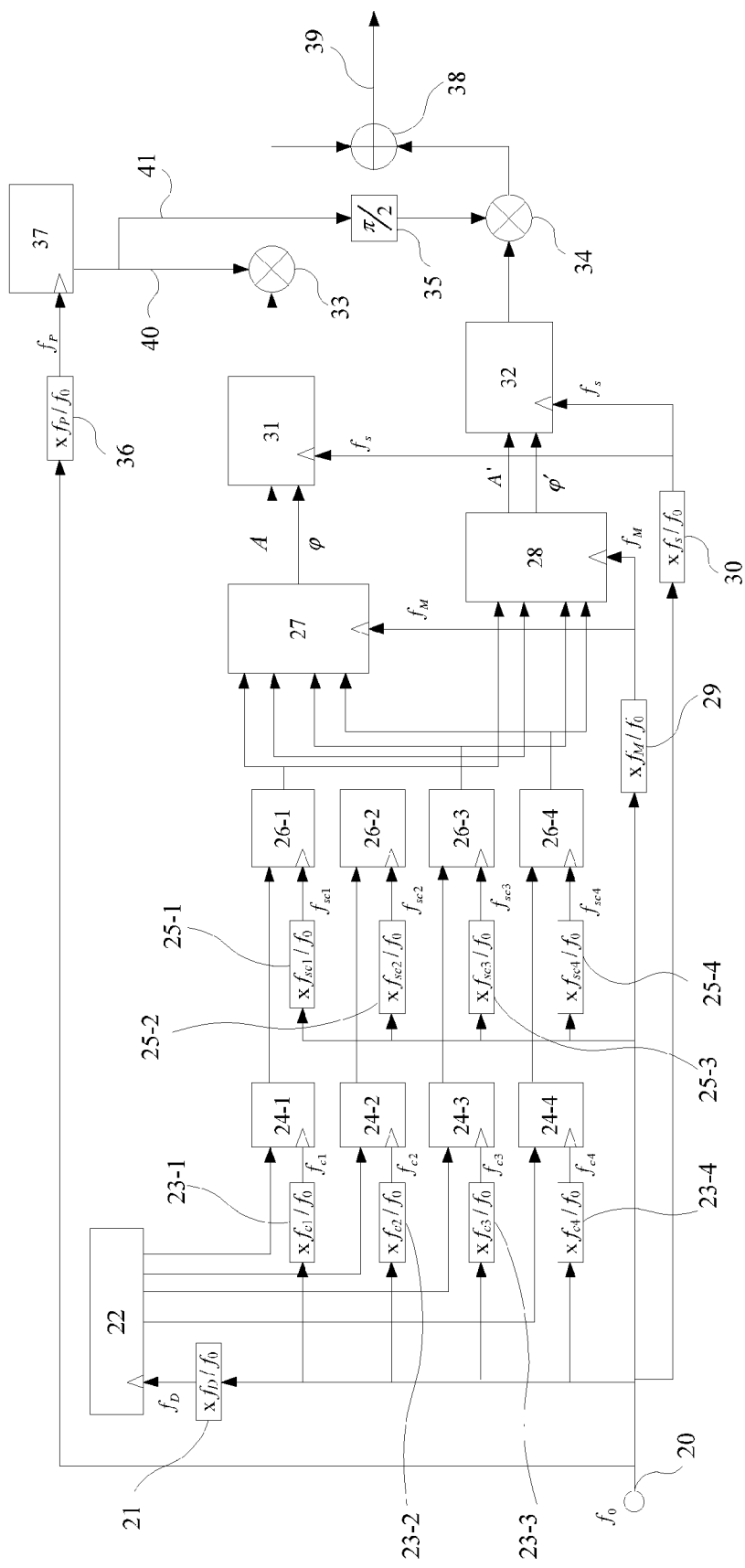
FIG. 6 illustrates a schematic diagram of another implementation of navigation satellite signal generating device, according to an embodiment of the present application.

FIG. 6 illustrates another particular implementation of the navigation satellite signal generating device 1, according to an embodiment of the present application. In this implementation, the driving clock of modules is generated by division or multiplication of the reference frequency clock $f_0$, for clock synchronization.

As shown in FIG. 6, the baseband signal generator 100 may include a reference frequency clock 20, a frequency converter 21, a message generator 22, a frequency converter 23, a spreading modulator 24, a frequency converter 25, and a spreading chip waveform generator 26. The multiplexed signal generator 200 may include an I-channel state selector 27, a Q-channel state selector 28, a frequency converter 29, a frequency converter 30, a first composite signal generator 31 and a second composite signal generator 32. The modulator 300 may include a first multiplier 33, a second multiplier 34, a π/2 phase shifting circuit 35, a frequency converter 36, a first carrier generator 37 and a first adder 38.

Specifically, the reference frequency clock 20, through the frequency converter 21, is converted into a data driving clock with a frequency $f_D$, which drives the message generator 22 to generate four binary navigation messages. If a pilot channel is required in some implementations, the navigation message of the corresponding channel keeps constant 0 or constant 1. The reference frequency clock, through the frequency converter 23-1, 23-2, 23-3 and 23-4, is converted into the driving clock with frequency of $f_{c1}$, $f_{c2}$, $f_{c3}$ and $f_{c4}$, respectively, which drives the spreading modulator 24-1, 24-2, 24-3, and 24-4 to generate four binary spreading sequences, respectively, with the spreading code rate of $f_{c1}$, $f_{c2}$, $f_{c3}$ and $f_{c4}$. The spreading code rate is the positive integer multiple of $f_D$.

The four navigation messages generated by the message generator 22 are transmitted into the spreading modulator 24-1, 24-2, 24-3 and 24-4 respectively, to make module-2 additive combination with the spreading sequence. The results of the module 2 additive combination are sent into the spreading chip waveform generator 26-1, 26-2, 26-3, 26-4 respectively. The spreading chip waveform generator is driven by subcarrier driving clocks with the frequency of $f_{sc1}$, $f_{sc2}$, $f_{sc3}$ and $f_{sc4}$, which are generated by sending the clock 20 into the frequency converter 25-1, 25-2, 25-3 and 25-4 respectively. The spreading chip waveform generator makes BCS chip waveform assignment to the spreading sequence modulated with navigation message, and the outputs are noted as baseband signals $s_1(t)$, $s_2(t)$, $s_3(t)$, $s_4(t)$ separately. Where $f_{sc1}=K_1 f_{c1}$, $f_{sc2}=K_2 f_{c2}$, $f_{sc3}=K_3 f_{c3}$, $f_{sc4}=K_4 f_{c4}$, and $K_1$, $K_2$, $K_3$, $K_4$ are integers greater than or equal to 1.

The clock 20, through the frequency converter 29, is converted to a driving clock with a frequency $f_M$, which drives the I-channel state selector 27 and the Q-channel state selector 28. The $f_M$ is greater than the least common multiple $f_k$ of $f_{sc1}$, $f_{sc2}$, $f_{sc3}$ and $f_{sc4}$, and there is $f_M = M f_k$, where M is a positive integer. It is ensured that every phase-shifting point of the value of the $s_i(t)$ (i=1, 2, 3, 4) is synchronous to $f_M$. During the time slot $t \in [n/f_M, (n+1)/f_M)$, the sign $s_{i,n} \in \{+1,-1\}$ of the value $s_i(t)$ keeps invariant.

$s_1(t)$, $s_2(t)$, $s_3(t)$, $s_4(t)$ are sent into the I-channel state selector 27. The state selector 27 calculates the amplitude A and phase offset φ of the I-channel baseband composite signal, based on the power parameters and the values of $s_1(t)$, $s_2(t)$, $s_3(t)$, $s_4(t)$ in the current time slot of the baseband signal. The calculation rules can be expressed as:

$$A = -\sqrt{\left(\sqrt{c_1}\, s_1(t) + \sqrt{c_3}\, s_3(t)\right)^2 + \left(\sqrt{c_2}\, s_2(t) - \sqrt{c_4}\, s_4(t)\right)^2}$$

$$\varphi = -\mathrm{atan2}\left(\sqrt{c_1}\, s_1(t) + \sqrt{c_3}\, s_3(t),\; \sqrt{c_2}\, s_2(t) - \sqrt{c_4}\, s_4(t)\right).$$

The clock 20, through the frequency converter 30, is converted to a driving clock with a frequency $f_s$, which drives the first composite signal generator 31 to generate the square wave subcarrier with the frequency of $f_s$. The amplitude A and phase offset φ of the composite signal from the I-channel state selector 27 are sent into the first composite signal generator 31, so as to control the amplitude and phase offset of the square wave subcarrier generated by the first composite signal generator 31. The output of the first composite signal generator 31 can be expressed as:

$I(t) = A \times sgn[\sin(2\pi f_s t + \varphi)]$.

$s_1(t)$, $s_2(t)$, $s_3(t)$, $s_4(t)$ are sent into the Q-channel state selector 28. The state selector 28 calculates the amplitude A' and phase offset φ' of the Q-channel baseband composite signal, based on the power parameters and the values of $s_1(t)$, $s_2(t)$, $s_3(t)$, $s_4(t)$ in the current time slot of the baseband signal. The calculation rules can be expressed as:

$$A' = \sqrt{\left(\sqrt{c_1}\, s_1(t) - \sqrt{c_3}\, s_3(t)\right)^2 + \left(\sqrt{c_2}\, s_2(t) + \sqrt{c_4}\, s_4(t)\right)^2}$$

$$\varphi' = \mathrm{atan2}\left(\sqrt{c_2}\, s_2(t) + \sqrt{c_4}\, s_4(t),\; \sqrt{c_1}\, s_1(t) - \sqrt{c_3}\, s_3(t)\right).$$

The driving clock with the frequency $f_s$ drives the second composite signal generator 32 so as to generate the square wave subcarrier with the frequency of $f_s$. The amplitude A' and phase offset φ' of the composite signal from the Q-channel state selector 28 are sent into the second composite signal generator 32, so as to control the amplitude and phase offset of the square wave subcarrier generated by the second composite signal generator 32. The output of the second composite signal generator 32 can be expressed as:

$Q(t) = A' \times sgn[\sin(2\pi f_s t + \varphi')]$

The reference clock 20, through the frequency converter 36, is converted to a driving clock with a frequency $f_{RF}$, which drives the first carrier generator 37 to generate a carrier with the frequency of $f_{RF}$. The carrier signal is divided into two branches. The carrier signal of a branch 40 and the output of the first composite signal generator 31 are sent into the first multiplier 33. The carrier signal of the other branch 41, after passing through the π/2 phase shifting circuit 35, turns into a carrier signal with a phase orthogonal to that of the branch 40. The carrier signal of the other branch 41 and the output of the second composite signal generator 32 are sent into the second multiplier 34. The outputs of the two multipliers are sent into the first adder 38 so as to generate the navigation satellite signal 39 with constant envelope.

Figure 7:
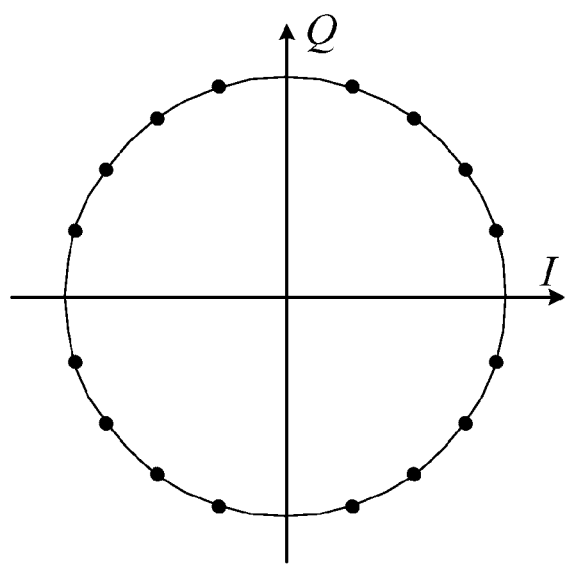
FIG. 7 illustrates a constellation of multiplexed baseband signal when the power ratio of the four signal components is $c_1:c_2:c_3:c_4=1:2:3:8$, according to an embodiment of the present application.

FIG. 7 illustrates the Fresnel constellation of the multiplexed baseband signal with $c_1:c_2:c_3:c_4=1:2:3:8$. As shown, the multiplexed signal under this condition is a 16-PSK signal, while the constellation points are not uniformly distributed. When other values are set for $c_1:c_2:c_3:c_4$, the number of constellation points and the distribution of the constellation points can be different from that in the present example.

Figure 8:
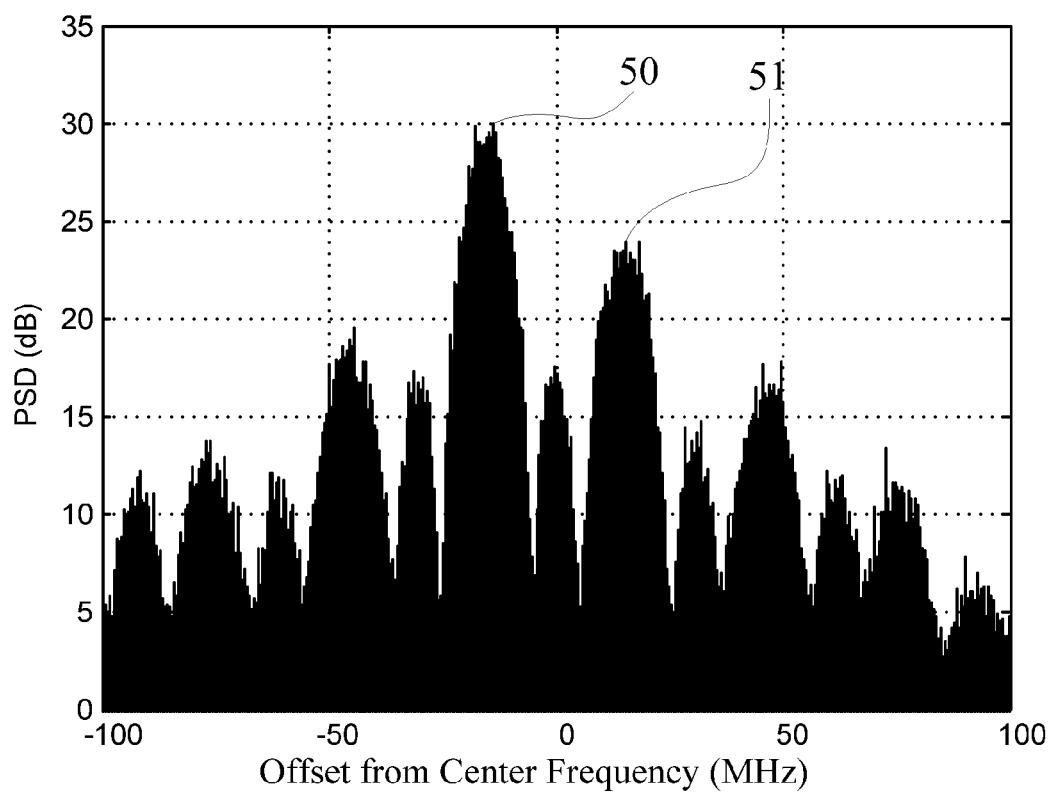
FIG. 8 illustrates power spectral density (PSD) of multiplexed signal, according to an embodiment of the present application.

FIG. 8 illustrates the power spectral density (PSD) of the multiplexed baseband signal with $c_1:c_2:c_3:c_4=1:2:3:8$, $f_{c1}=f_{c2}=f_{c3}=f_{c4}=10.23$ MHz, rectangular pulse spreading waveform (i.e. BPSK-R modulation) adopted for each signal component, and $f_s=15.345$ MHz. In the PSD, the two signal components sharing the same frequency are added together and difficult to be distinguished from each other. However, in the present embodiment, the power of the upper sideband main lobe 51 with the central frequency of $f_1$ is about 5.5 dB lower than that of the lower sideband main lobe 50 with the central frequency of $f_2$, corresponding to the design specifications that the ratio between the total power of the upper sideband signal components and the total power of the lower sideband signal components is $(c_1+c_2)/(c_3+c_4)=3/11$ (−5.6 dB). Thus, according to the navigation satellite signal generating method presented in the application, the constant envelope multiplexing (CEM) of four signal components with different power can be achieved.

Another aspect of the present application provides a navigation satellite signal generating method. According to this method, the CEM of the four signal components $(S_1, S_2, S_3, S_4)$ on two frequencies $(f_1, f_2)$ can be achieved.

Figure 9:
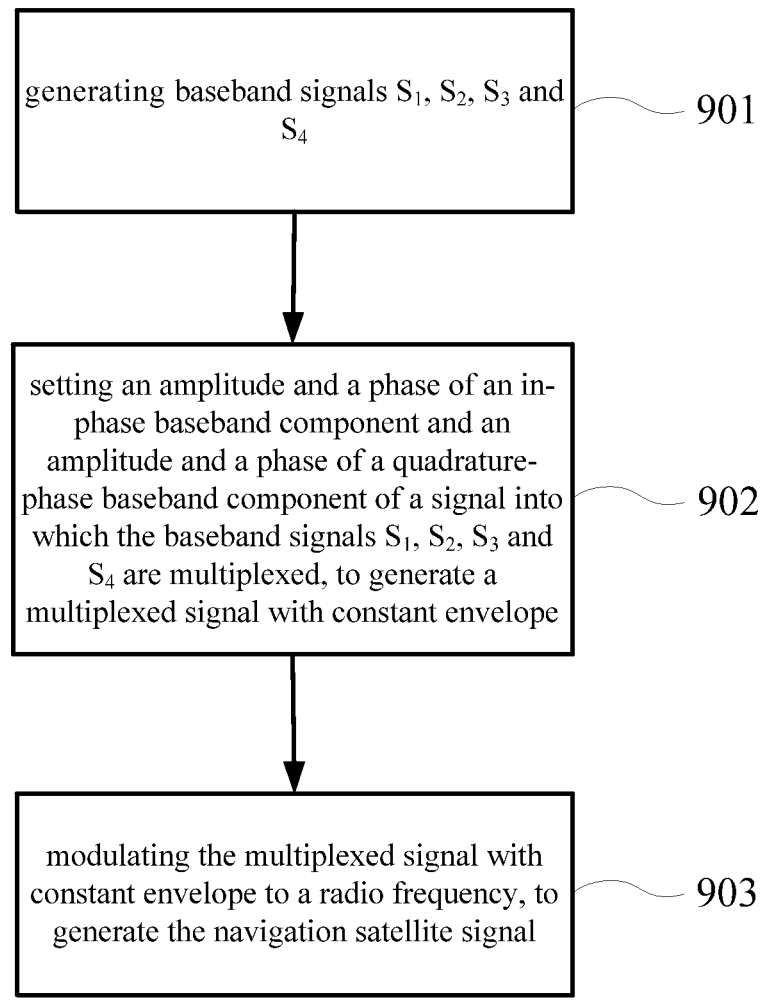
FIG. 9 illustrates a flowchart of navigation satellite signal generating method, according to an embodiment of the present application.

FIG. 9 illustrates a flowchart of the navigation satellite signal generating method, according to an embodiment of the present application. As shown in FIG. 9, in Step 901, a first baseband signal $S_1$, a second baseband signal $S_2$, a third baseband signal $S_3$, and a fourth baseband signal $S_4$ are generated. In Step 902, an amplitude and a phase of an in-phase baseband component of and an amplitude and a phase of a quadrature-phase baseband component of a signal multiplexed of the first baseband signal $S_1$, the second baseband signal $S_2$, the third baseband signal $S_3$, and the fourth baseband signal $S_4$ are set, in order to generate a multiplexed signal with constant envelope. In Step 903, the multiplexed signal with constant envelope is modulated to radio frequency, so as to generate a navigation satellite signal. Here, the first baseband signal $S_1$ and the second baseband signal $S_2$ are modulated on a first carrier frequency $f_1$ with carrier phases thereof orthogonal to each other, the third baseband signal $S_3$ and the fourth baseband signal $S_4$ are modulate on a second carrier frequency $f_2$ with carrier phases thereof orthogonal to each other.

According to an embodiment, the powers $c_1$, $c_2$, $c_3$ and $c_4$ of baseband signals $S_i$ can be set according to actual requirements. In Step 902, the amplitudes and phases of the in-phase baseband component and quadrature-phase baseband component of the multiplexed signal may be set according to the power parameters of the baseband signals.

According to an embodiment, in Step 902, the amplitudes and phases of the in-phase baseband component and quadrature-phase baseband component of the multiplexed signal may be set according to the values of the baseband signals.

According to an embodiment, in Step 903, the multiplexed signal with constant envelope may be modulated to the carrier with a central frequency of $f_{RF}=(f_1+f_2)/2$, so as to generate the navigation satellite signal.

According to an embodiment of the present application, the navigation satellite signal generating method further includes: calculating the amplitude $A(t)$ and phase $\phi(t)$ of the in-phase baseband component $I(t)$, and calculating the amplitude $A'(t)$ and phase $\phi'(t)$ of the quadrature-phase baseband component $Q(t)$, based on the power parameters and values of the first baseband signal $S_1$, the second baseband signal $S_2$, the third baseband signal $S_3$ and the fourth baseband signal $S_4$; and generating the in-phase baseband component $I(t)$, based on the calculated amplitude $A(t)$ and phase $\phi(t)$, where the in-phase baseband component $I(t)$ is expressed as $$I(t)=A(t)\times sgn[\sin(2\pi f_s t+\phi(t))];$$

and generating the quadrature-phase baseband component $Q(t)$ based on the calculated amplitude $A'(t)$ and phase $\phi'(t)$, where the quadrature-phase baseband component $Q(t)$ is expressed as $$Q(t)=A'(t)\times sgn[\sin(2\pi f_s t+\phi'(t))],$$

where $f_s=|f_1-f_2|/2$, sgn stands for the sign function $$sgn(x)=\begin{cases}+1,& x\geq 0\\-1,& x<0\end{cases}.$$

According to an embodiment of the present application, the navigation satellite signal generating method further includes: calculating the amplitude $A(t)$ and phase $\phi(t)$ of the in-phase baseband component $I(t)$, and calculating the amplitude $A'(t)$ and phase $\phi'(t)$ of the quadrature-phase baseband component $Q(t)$, according to the following equations $$A=-\sqrt{\left(\sqrt{c_1}\,s_1(t)+\sqrt{c_3}\,s_3(t)\right)^2+\left(\sqrt{c_2}\,s_2(t)-\sqrt{c_4}\,s_4(t)\right)^2}$$

$$\varphi=-\mathrm{atan2}\left(\sqrt{c_1}\,s_1(t)+\sqrt{c_3}\,s_3(t),\sqrt{c_2}\,s_2(t)-\sqrt{c_4}\,s_4(t)\right), \text{ and}$$

$$A'=\sqrt{\left(\sqrt{c_1}\,s_1(t)-\sqrt{c_3}\,s_3(t)\right)^2+\left(\sqrt{c_2}\,s_2(t)+\sqrt{c_2}\,s_4(t)\right)^2}$$

$$\varphi'=\mathrm{atan2}\left(\sqrt{c_2}\,s_2(t)+\sqrt{c_4}\,s_4(t),\sqrt{c_1}\,s_1(t)-\sqrt{c_3}\,s_3(t)\right),$$

where $s_i(t)$, $i=1,2,3,4$ stands for the i-th baseband signal $S_i$, $c_i$ stands for the power parameters of the i-th baseband signal $S_i$; and atan 2 is the four-quadrant arctangent function:

$$\mathrm{atan2}(y,x)=\begin{cases}\arccos\left(\dfrac{y}{\sqrt{x^2+y^2}}\right),& x\geq 0,\sqrt{x^2+y^2}>0\\-\arccos\left(\dfrac{y}{\sqrt{x^2+y^2}}\right),& x<0\\0,& \sqrt{x^2+y^2}=0\end{cases}.$$

While embodiments and specific implementations of the navigation satellite signal generating method and generating device are described as above referring to the drawings, it should be understood that they have been presented by way of example only, but not limitation. It will be apparent to those skilled in the art that various changes in form and detail can be made therein without departing from the spirit and scope of the invention.

Embodiments of the present application described above have focused on the transmission side, that is, upon navigation satellite signal generating methods and generating devices. In addition, embodiments of the present application also relate to signals generated by the navigation satellite signal generating methods and generating devices as those described above.

Moreover, those skilled in the art appreciates that converse system, method, apparatus and receiver are required to receive and process the signals generated by the aforementioned navigation satellite signal generating methods and generating devices. Therefore, embodiments of the present application also relate to systems, methods, apparatuses and receiving devices used for processing navigation satellite signals as those described above.

Figure 10:
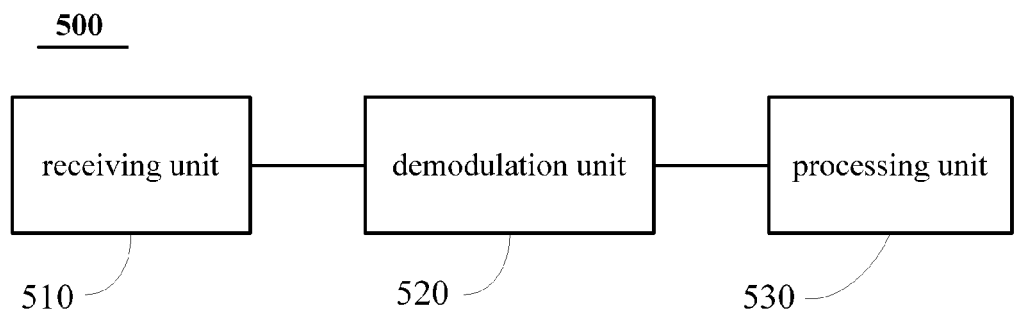
FIG. 10 illustrates a block diagram of navigation satellite signal receiving device, according to an embodiment of the present application.

According to an embodiment of the present application, a navigation satellite signal receiving device is provided, in order to receive the navigation satellite signal generated by the aforementioned navigation satellite signal generating methods or the generating devices. In this embodiment, the signal components modulated on the first carrier and the second carrier can be processed respectively. As shown in FIG. 10, a signal receiving device 500 includes a receiving unit 510, a demodulation unit 520, and a processing unit 530. Here, the receiving unit 510 receives the navigation satellite signal; the demodulation unit 521 demodulates the signal component modulated on the first carrier of the received navigation satellite signal, and demodulates the signal component modulated on the second carrier of the received navigation satellite signal; and the processing unit 530 obtains the first baseband signal $S_1$ and the second baseband signal $S_2$, according to the signal component modulated on the first carrier which is demodulated by the demodulation unit, and obtains the third baseband signal $S_3$ and the fourth baseband signal $S_4$, according to the signal component modulated on the second carrier which is demodulated by the demodulation unit.

Figure 11:
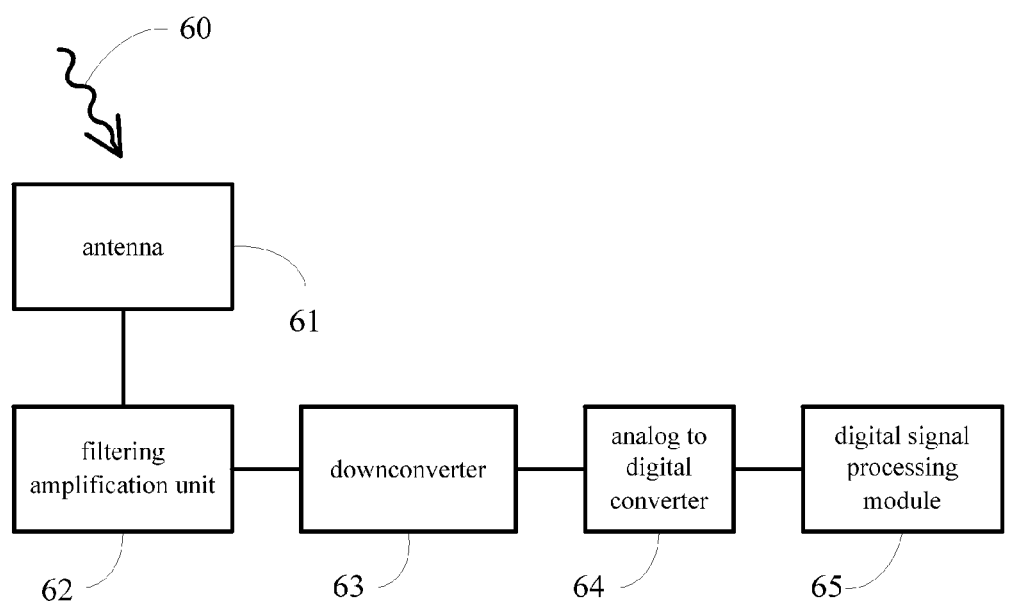
FIG. 11 illustrates a schematic diagram of an implementation of navigation satellite signal receiving device, according to an embodiment of the present application.

FIG. 11 illustrates the schematic diagram of a particular implementation of navigation satellite signal receiving device, according to an embodiment of the present application. According to the embodiment, the receiving unit 510 may include an antenna 61; the demodulation unit 520 may include a filtering amplification unit 62, a downconverter 63, and an Analog to Digital Converter (ADC) 64; and the processing unit 530 may include a digital signal processing module 65.

Referring to FIG. 11, when signal components are received separately, the navigation satellite signal 60 is received from antenna 61. After received by the antenna 61, the received navigation satellite signal 60 is sent into the filtering amplification unit 62, where the navigation satellite signal 60 is filtered, in order to resist the strong interference signals and out of band noises, and then the navigation satellite signal 60 is amplified. When processing the upper sideband signal component $s_1(t)$ or $s_2(t)$, the central frequency of the filtering unit is set near $f_1$, with bandwidth greater than or equal to the bandwidth of the signal component $s_1(t)$ or $s_2(t)$ to be received, in order to ensure that enough power of the signal component $s_1(t)$ or $s_2(t)$ passes the filtering unit; similarly, when processing the upper sideband signal component $s_3(t)$ or $s_4(t)$, the central frequency of filter is set near $f_2$, with bandwidth greater than or equal to the bandwidth of the signal component $s_3(t)$ or $s_4(t)$ to be received, in order to ensure that enough power of the signal component $s_3(t)$ or $s_4(t)$ passes the filtering unit.

The filtered and amplified signal from the filtering amplification unit 62 is sent into the downconverter 63, in order to convert the carrier frequency of the signal component to a corresponding Intermediate Frequency (IF); then the signal is sent into the ADC 64 for the sampling and quantization of the signal, and a digital IF signal is obtained.

The digital IF signal from the ADC 64 is sent into the digital signal processing module 65. This module can be implemented by FPGA, ASIC, universal computing unit or the combination of the aforementioned devices, so as to achieve the corresponding acquisition, tracking, demodulation to the baseband signal component to be processed.

Moreover, according to an embodiment of the present application, a navigation satellite signal receiving method is provided, to receive the navigation satellite signal generated by the aforementioned navigation satellite signal generating method or generating device. The signal receiving method includes: receiving the navigation satellite signal; demodulates a signal component modulated on a first carrier of the received navigation satellite signal, so as to obtain a first baseband signal $S_1$ and a second baseband signal $S_2$; and demodulates a signal component modulated on a second carrier of the received navigation satellite signal, so as to obtain a third baseband signal $S_3$ and a fourth baseband signal $S_4$.

According to an embodiment of the present application, a navigation satellite signal receiving device is provided, in order to receive the navigation satellite signal generated by the aforementioned navigation satellite signal generating method or the generating device. In this embodiment, the received navigation satellite signal with a central frequency of $(f_1+f_2)/2$ can be processed as a whole. As shown in the FIG. 10, the signal receiving device 500 includes a receiving unit 510, a demodulation unit 520, and a processing unit 530. Here, the receiving unit 510 receives the navigation satellite signal; the demodulation unit 520 demodulates navigation satellite signal, so as to obtain an in-phase baseband component and a quadrature-phase baseband component of the multiplexed signal; and the processing unit 530 obtains a first baseband signal $S_1$, a second baseband signal $S_2$, a third baseband signal $S_3$ and a fourth baseband signal $S_4$, according to an amplitude and a phase of the in-phase baseband component and an amplitude and a phase of the quadrature-phase baseband component of the multiplexed signal.

As can be understood, since the value of the baseband signal is $+/-1$, the combination of four baseband signal values $[S_1, S_2, S_3, S_4]$ may have up to 16 combination states. The processing unit 530 may, for an in-phase and quadrature-phase baseband component local replica corresponding to each of the 16 combination states, calculate a correlation between the in-phase and quadrature-phase baseband component local replica and the in-phase and quadrature-phase baseband component obtained from the demodulation unit 540, so as to determine values of the received first baseband signal $S_1$, the second baseband signal $S_2$, the third baseband signal $S_3$, and the fourth baseband signal $S_4$.

Referring to FIG. 11 again, when the multiplexed signal is received and processed as a whole, the navigation satellite signal 60 is received from the antenna 61 in the receiver. The received navigation satellite signal 60 from the antenna 61 is sent into the filtering amplification unit 62, for filtering the navigation satellite signal 60 to resist the strong interference signals and out of band noises, and for amplifying the navigation satellite signal 60. The central frequency of filtering unit is set near $(f_1+f_2)/2$, with a bandwidth greater than or equal to $2f_s$, to ensure that enough power of the whole complexed signal passes the filtering unit. If the design of the filtering unit allows, it is suggested to ensure that the first main lobe power of every signal component passes the filtering unit.

The filtered and amplified signal from the filtering amplification unit 62 is sent into the downconverter 63, to convert the carrier frequency of the signal component to an Intermediate Frequency (IF); then the signal is sent into the ADC 64 for the sampling and quantization of the signal, to obtain a digital IF signal.

The digital IF signal from the ADC 64 is sent into the digital signal processing module 65. This module can be implemented by FPGA, ASIC, universal computing unit or the combination of the aforementioned devices. The digital IF signal is multiplied by the in-phase carrier and quadrature-phase carrier generated by the receiver, in order to remove the IF and Doppler of the digital signal, so as to obtain the receiver in-phase baseband signal SI(t) and the receiver quadrature-phase baseband signal SQ(t).

The digital signal processing module 65 is configured to generate spreading sequences of four signal components with spreading chip waveform assignment. According to all the possible value combinations of the binary baseband local signal replica of the four signal components, the in-phase baseband waveform local replica $\tilde{I}_i(t)$ and the quadrature-phase baseband waveform local replica $\tilde{Q}_i(t)$ are generated by the digital signal processing module 65 corresponding to each combination, at each epoch. The total number of value combinations is noted as g. It can be calculated that if N signal components relate to data channels, there is $g=2^N$. For a specific instance among the g value combinations of $S_i=\{\tilde{s}_1, \tilde{s}_2, \tilde{s}_3, \tilde{s}_4\}$, the generating rule of $\tilde{I}_i(t)$ and $\tilde{Q}_i(t)$ is $$\tilde{I}_i(t) = A_i \times sgn[\sin(2\pi f_s t + \phi_i)]$$

$$\tilde{Q}_i(t) = A'_i \times sgn[\sin(2\pi f_s t + \phi'_i)]$$

where $$A_i = -\sqrt{\left(\sqrt{c_1}\,\tilde{s}_1 + \sqrt{c_3}\,\tilde{s}_3\right)^2 + \left(\sqrt{c_2}\,\tilde{s}_2 - \sqrt{c_4}\,\tilde{s}_4\right)^2}$$

-continued $$A'_i = \sqrt{(\sqrt{c_1}\tilde{s}_1 - \sqrt{c_3}\tilde{s}_3)^2 + (\sqrt{c_2}\tilde{s}_2 + \sqrt{c_4}\tilde{s}_4)^2}$$

$$\varphi_i = -\text{atan2}(\sqrt{c_1}\tilde{s}_1 + \sqrt{c_3}\tilde{s}_3, \sqrt{c_2}\tilde{s}_2 - \sqrt{c_4}\tilde{s}_4)$$

$$\varphi'_i = \text{atan2}(\sqrt{c_2}\tilde{s}_2 + \sqrt{c_4}\tilde{s}_4, \sqrt{c_1}\tilde{s}_1 - \sqrt{c_3}\tilde{s}_3).$$

The i-th (i=1,2, . . . , g) group of the in-phase baseband waveform local replica $\tilde{I}_i(t)$ is multiplied by the receiver in-phase baseband signal SI(t) and receiver quadrature-phase baseband signal SQ(t) respectively, and the results are sent into the integration-dump filter for coherent integration with the duration of TI, then the i-th (i=1,2, . . . , g) group of the first in-phase correlation value corr1$I_i$ and quadrature-phase correlation value corr1$Q_i$ are obtained; similarly, each group of the quadrature-phase baseband waveform local replica $\tilde{Q}_i(t)$ is multiplied by the receiver in-phase baseband signal SI(t) and receiver quadrature-phase baseband signal SQ(t) respectively, and the results are sent into the integration-dump filter for coherent integration with the duration of TI, then the i-th (i=1,2, . . . , g) group of the second in-phase correlation value corr2$I_i$ and quadrature-phase correlation value corr2$Q_i$ are obtained.

The seven step, the i-th (i=1,2, . . . , g) group of the first in-phase correlation value corr1$I_i$ and the first quadrature-phase correlation value corr1$Q_i$, the second in-phase correlation value corr2$I_i$ and the second quadrature-phase correlation value corr2$Q_i$ are combined according to the following rule, so as to obtain the i-th (i=1,2, . . . , g) group of the in-phase combination correlation value $I'_i$ and the quadrature-phase combination correlation value $Q'_i$. The rule is:

$$\begin{cases} I'_i = \text{corr2}I_i + \text{corr1}Q_i \\ Q'_i = \text{corr1}I_i - \text{corr2}Q_i \end{cases}.$$

If $\sqrt{I'^2_i + Q'^2_i}$ of a group of in-phase combination correlation value $I'_i$ and quadrature-phase combination correlation value $Q'_i$ is the maximum among all the groups, this group is selected as the optimal in-phase combination correlation value I' and the optimal quadrature-phase combination correlation value Q'. Then, the value I' and the value Q' may be processed through traditional acquisition methods and tracking loops.

Moreover, according to an embodiment of the present application, a navigation satellite signal receiving method is provided, so as to receive the navigation satellite signal generated by the aforementioned navigation satellite signal generating method or generating device. The signal receiving method includes: receiving the navigation satellite signal; demodulating the navigation satellite signal, so as to obtain an in-phase baseband component of and a quadrature-phase baseband component of the multiplexed signal; and obtaining a first baseband signal $S_1$, a second baseband signal $S_2$, a third baseband signal $S_3$ and a fourth baseband signal $S_4$, according to an amplitude and a phase of the in-phase baseband component of and an amplitude and a phase of the quadrature-phase baseband component of the multiplexed signal.

While embodiments and specific implementations of the navigation satellite signal receiving method and receiving device are described as above referring to the drawings, it should be understood that they have been presented by way of example only, and not limitation. Moreover, those skilled in the art appreciates that converse system, method, apparatus and receiver are required to receive and process the signals generated by the aforementioned navigation satellite signal generating methods and generating devices. Therefore, embodiments of the present application relate to any systems, methods apparatuses and receiving devices used for processing navigation satellite signals as those described above.

Embodiments of the present application may be implemented by hardware, software or the combination thereof. An aspect of the present application provides a program including executable instructions to implement the satellite navigation signal generating method, generating device, the satellite navigation signal receiving method, receiving device according to embodiments of the present application. In addition, the program can be stored in storage of any form, such as optical or magnetic readable media, chip, ROM, PROM, or any form of volatile or non-volatile memory device. According to an example of the embodiment of the present application, a machine-readable storage is provided for storing the program.

While various embodiments of the present application have been described above referring to the drawings, it should be understood that they have been presented by way of example only, and not limitation. It will be apparent to those skilled in the art that various changes in form and detail can be made therein without departing from the spirit and scope of the invention.

What is claimed is:

1. A navigation satellite signal generating device, comprising:
    a baseband signal generator to generate a first baseband signal $S_1$, a second baseband signal $S_2$, a third baseband signal $S_3$, and a fourth baseband signal $S_4$;
    a multiplexed signal generator to set, based on power parameters and values of the baseband signals, an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope; and
    a modulator to modulate the multiplexed signal with constant envelope to a radio frequency, so as to generate the navigation satellite signal,
    wherein the first baseband signal $S_1$ and the second baseband signal $S_2$ are modulated to a first carrier frequency $f_1$ with carrier phases orthogonal to each other, and the third baseband signal $S_3$ and the fourth baseband signal $S_4$ are modulated to a second carrier frequency $f_2$ with carrier phases orthogonal to each other.

2. The navigation satellite signal generating device as claimed in claim 1, wherein the power parameters are absolute powers of the baseband signals or relative powers of the baseband signals.

3. The navigation satellite signal generating device as claimed in claim 2, wherein the power parameters of any one, any two or any three of the baseband signals are zero, or the power parameter of each of the four baseband signals is non-zero.

4. The navigation satellite signal generating device as claimed in claim 1, wherein the multiplexed signal generator includes:
    a computing unit, to calculate the amplitude A(t) and the phase φ(t) of the in-phase baseband component I(t), and to calculate the amplitude A'(t) and the phase φ'(t) of the quadrature-phase baseband component Q(t), based on the power parameters and values of the first baseband signal $S_1$, the second baseband signal $S_2$, the third baseband signal $S_3$ and the fourth baseband signal $S_4$;

an in-phase channel generating unit, to generate the in-phase baseband component I(t), based on the amplitude A(t) and phase φ(t) calculated by the computing unit, wherein the in-phase baseband component I(t) is expressed as $$I(t)=A(t)\times sgn[\sin(2\pi f_s t+\phi(t))]; \text{ and}$$

a quadrature-phase channel generating unit, to generate the quadrature-phase baseband component Q(t), based on the amplitude A'(t) and the phase φ'(t) calculated by the computing unit, wherein the quadrature-phase baseband component Q(t) is expressed as $$Q(t)=A'(t)\times sgn[\sin(2\pi f_s t+\phi'(t))]; \text{ and}$$

wherein $f_s=|f_1-f_2|/2$, sgn stands for the sign function, and $$sgn(x)=\begin{cases}+1, & x\geq 0\\ -1, & x<0\end{cases}.$$

5. The navigation satellite signal generating device as claimed in claim 4, wherein the computing unit calculates the amplitude A(t) and the phase φ(t) of the in-phase baseband component I(t), and calculates the amplitude A'(t) and the phase φ'(t) of the quadrature-phase baseband component Q(t), according to equations of:

$$A=-\sqrt{\left(\sqrt{c_1}\,s_1(t)+\sqrt{c_3}\,s_3(t)\right)^2+\left(\sqrt{c_2}\,s_2(t)-\sqrt{c_4}\,s_4(t)\right)^2}$$

$$\varphi=-\mathrm{atan2}\left(\sqrt{c_1}\,s_1(t)+\sqrt{c_3}\,s_3(t),\sqrt{c_2}\,s_2(t)-\sqrt{c_4}\,s_4(t)\right), \text{ and}$$

$$A'=\sqrt{\left(\sqrt{c_1}\,s_1(t)-\sqrt{c_3}\,s_3(t)\right)^2+\left(\sqrt{c_2}\,s_2(t)+\sqrt{c_4}\,s_4(t)\right)^2}$$

$$\varphi'=\mathrm{atan2}\left(\sqrt{c_2}\,s_2(t)+\sqrt{c_4}\,s_4(t),\sqrt{c_1}\,s_1(t)-\sqrt{c_3}\,s_3(t)\right),$$

wherein $s_i(t)$, i=1,2,3,4 stands for the i-th baseband signal $S_i$, $c_i$ stands for the power parameter of the i-th baseband signal $S_i$;

wherein atan2 is the four-quadrant arctangent function, $$\mathrm{atan2}(y,x)=\begin{cases}\arccos\left(\dfrac{y}{\sqrt{x^2+y^2}}\right), & x\geq 0, \sqrt{x^2+y^2}>0\\ -\arccos\left(\dfrac{y}{\sqrt{x^2+y^2}}\right), & x<0\\ 0, & \sqrt{x^2+y^2}=0\end{cases}.$$

6. The navigation satellite signal generating device as claimed in claim 1, wherein the baseband signal generator includes:
   a source to generate messages to be broadcast;
   a spreading modulator to modulate the messages generated by the source by using a spreading sequence; and
   a spreading chip waveform generator to assign a waveform to each bit of the spreading sequence modulated with navigation messages, to generate a baseband signal.

7. The navigation satellite signal generating device as claimed in claim 1, wherein the modulator includes:
   a carrier generator to generate a carrier of radio frequency;
   a first multiplier to modulate the in-phase baseband component of the multiplexed signal generated by the multiplexed signal generator to the carrier of radio frequency;
   a second multiplier to modulate the quadrature-phase baseband component of the multiplexed signal generated by the multiplexed signal generator to the carrier of radio frequency; and
   an adder to add together the in-phase baseband component of the multiplexed signal modulated to the carrier of radio frequency and the quadrature-phase baseband component of the multiplexed signal modulated to the carrier of radio frequency, so as to generate the navigation satellite signal.

8. A navigation satellite signal generating method, comprising:
   using a baseband signal generator device to generate a first baseband signal $S_1$, a second baseband signal $S_2$, a third baseband signal $S_3$, and a fourth baseband signal $S_4$;
   setting, based on power parameters and values of the baseband signals, an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope; and
   modulating the multiplexed signal with constant envelope to a radio frequency, so as to generate the navigation satellite signal,
   wherein the first baseband signal $S_1$ and the second baseband signal $S_2$ are modulated to a first carrier frequency $f_1$ with carrier phases orthogonal to each other, and the third baseband signal $S_3$ and the fourth baseband signal $S_4$ are modulated to a second carrier frequency $f_2$ with carrier phases orthogonal to each other.

9. The navigation satellite signal generating method as claimed in claim 8, wherein the power parameters are absolute powers of the baseband signals or relative powers of the baseband signals.

10. The navigation satellite signal generating method as claimed in claim 9, wherein the power parameters of any one, any two or any three of the baseband signals are zero, or the power parameter of each of the four baseband signals is non-zero.

11. The navigation satellite signal generating method as claimed in claim 8, further comprising:
   calculating the amplitude A(t) and the phase φ(t) of the in-phase baseband component I(t), and calculating the amplitude A'(t) and the phase φ'(t) of the quadrature-phase baseband component Q(t), based on the power parameters and values of the first baseband signal $S_1$, the second baseband signal $S_2$, the third baseband signal $S_3$ and the fourth baseband signal $S_4$;
   generating, based on the calculated amplitude A(t) and phase φ(t), an in-phase baseband component I(t), which is expressed as $$I(t)=A(t)\times sgn[\sin(2\pi f_s t+\phi(t))]; \text{ and}$$

generating, based on the calculated amplitude A'(t) and the phase φ'(t), a quadrature-phase baseband component Q(t), which is expressed as $$Q(t)=A'(t)\times sgn[\sin(2\pi f_s t+\phi'(t))],$$

wherein $f_s=|f_1-f_2|/2$, sgn stands for the sign function, and $$\text{sgn}(x) = \begin{cases} +1, & x \geq 0 \\ -1, & x < 0 \end{cases}.$$

12. The navigation satellite signal generating method as claimed in claim 11, further comprising:
calculating the amplitude A(t) and the phase φ(t) of the in-phase baseband component I(t), and calculating the amplitude A(t) and the phase φ'(t) of the quadrature-phase baseband component Q(t), according to equations of:

$$A = -\sqrt{\left(\sqrt{c_1}\, s_1(t) + \sqrt{c_3}\, s_3(t)\right)^2 + \left(\sqrt{c_2}\, s_2(t) - \sqrt{c_4}\, s_4(t)\right)^2}$$

$$\varphi = -\operatorname{atan2}\left(\sqrt{c_1}\, s_1(t) + \sqrt{c_3}\, s_3(t),\ \sqrt{c_2}\, s_2(t) - \sqrt{c_4}\, s_4(t)\right), \text{ and}$$

$$A' = \sqrt{\left(\sqrt{c_1}\, s_1(t) - \sqrt{c_3}\, s_3(t)\right)^2 + \left(\sqrt{c_2}\, s_2(t) + \sqrt{c_4}\, s_4(t)\right)^2}$$

$$\varphi' = \operatorname{atan2}\left(\sqrt{c_2}\, s_2(t) + \sqrt{c_4}\, s_4(t),\ \sqrt{c_1}\, s_1(t) - \sqrt{c_3}\, s_3(t)\right),$$

wherein $s_i(t), i=1,2,3,4$ stands for the i-th baseband signal $S_i$, $c_i$ stands for the power parameter of the i-th baseband signal $S_i$;
wherein atan2 is the four-quadrant arctangent function, $$\operatorname{atan2}(y, x) = \begin{cases} \arccos\left(\dfrac{y}{\sqrt{x^2+y^2}}\right), & x \geq 0,\ \sqrt{x^2+y^2} > 0 \\ -\arccos\left(\dfrac{y}{\sqrt{x^2+y^2}}\right), & x < 0 \\ 0, & \sqrt{x^2+y^2} = 0 \end{cases}.$$

13. The navigation satellite signal generating method as claimed in claim 8, wherein said generating step includes:
generating messages to be broadcast;
modulating the messages generated by a source by using a spreading sequence; and
assigning a waveform to each bit of the spreading sequence modulated with navigation messages, to generate a baseband signal.

14. The navigation satellite signal generating method as claimed in claim 8, wherein said modulating step includes:
generating a carrier of radio frequency;
modulating the in-phase baseband component of the multiplexed signal to the carrier of radio frequency;
modulating the quadrature-phase baseband component of the multiplexed signal to the carrier of radio frequency; and
adding together the in-phase baseband component of the multiplexed signal modulated to the carrier of radio frequency and the quadrature-phase baseband component of the multiplexed signal modulated to the carrier of radio frequency, so as to generate the navigation satellite signal.

15. A signal receiving device to receive a navigation satellite signal, the device comprising:
a receiving unit to receive a navigation satellite signal, wherein an amplitude and a phase of an in-phase baseband component and an amplitude and a phase of a quadrature-phase baseband component of an interim signal from which the navigation satellite signal is derived are set based on power parameters and values of baseband signals;
a demodulation unit to demodulate a signal component modulated on a first carrier of the navigation satellite signal received by the receiving unit, and to demodulate a signal component modulated on a second carrier of the navigation satellite signal received by the receiving unit; and
a processing unit to obtain a first baseband signal $S_1$ and a second baseband signal $S_2$ based on the signal component modulated on the first carrier which is demodulated by the demodulation unit, and to obtain a third baseband signal $S_3$ and a fourth baseband signal $S_4$ based on the signal component modulated on the second carrier which is demodulated by the demodulation unit.

16. A navigation satellite signal receiving method, the method comprising:
receiving a navigation satellite signal, wherein an amplitude and a phase of an in-phase baseband component and an amplitude and a phase of a quadrature-phase baseband component of an interim signal from which the navigation satellite signal is derived are set based on power parameters and values of baseband signals;
using a demodulation circuit to demodulate a signal component modulated on a first carrier of the received navigation satellite signal to obtain a first baseband signal $S_1$ and a second baseband signal $S_2$; and
using the demodulation circuit to demodulate a signal component modulated on a second carrier of the received navigation satellite signal to obtain a third baseband signal $S_3$ and a fourth baseband signal $S_4$.

17. A signal receiving device to receive a navigation satellite signal, the device comprising:
a receiving unit to receive a navigation satellite signal, wherein an amplitude and a phase of an in-phase baseband component and an amplitude and a phase of a quadrature-phase baseband component of an interim signal from which the navigation satellite signal is derived are set based on power parameters and values of baseband signals;
a demodulation unit to demodulate the navigation satellite signal so as to obtain an in-phase baseband component and a quadrature-phase baseband component of the multiplexed signal; and
a processing unit to obtain a first baseband signal $S_1$, a second baseband signal $S_2$, a third baseband signal $S_3$ and a fourth baseband signal $S_4$, based on an amplitude and a phase of the in-phase baseband component and an amplitude and a phase of the quadrature-phase baseband component of the multiplexed signal.

18. A navigation satellite signal receiving method, comprising:
receiving a navigation satellite signal, wherein an amplitude and a phase of an in-phase baseband component and an amplitude and a phase of a quadrature-phase baseband component of an interim signal from which the navigation satellite signal is derived are set based on power parameters and values of baseband signals;
using a demodulation circuit to demodulate the navigation satellite signal to obtain an in-phase baseband component and a quadrature-phase baseband component of a multiplexed signal; and
obtaining a first baseband signal $S_1$, a second baseband signal $S_2$, a third baseband signal $S_3$ and a fourth baseband signal $S_4$, based on an amplitude and a phase of the in-phase baseband component and an amplitude and a phase of the quadrature-phase baseband component of the multiplexed signal.

19. The navigation satellite signal receiving method in claim 18, the method further comprising:
receiving, filtering and then amplifying the navigation satellite signal, wherein a central frequency of the filtering is set at $(f_1+f_2)/2$;
converting a carrier frequency of the signal component to be processed to a corresponding intermediate frequency, and converting the signal component from analog to digital by sampling and quantizing the signal;
multiplying the converted digital intermediate frequency signal by an in-phase carrier and a quadrature-phase carrier respectively, so as to obtain a receiver in-phase baseband signal SI(t) and a receiver quadrature-phase baseband signal SQ(t);
generating a spreading sequence of four signal component with spreading chip waveform assignment by using a digital signal processor based on the converted digital intermediate frequency signal, and according to all the possible value combinations of the binary baseband local signal replica of the four signal components, generating an in-phase baseband waveform local replica $\tilde{I}_q(t)$ and a quadrature-phase baseband waveform local replica $\tilde{Q}_q(t)$ corresponding to each combination, at each epoch,
wherein the number of value combinations is noted as g, g ≤16, and for a special case $S_i=\{\tilde{s}_1^{(q)}, \tilde{s}_2^{(q)}, \tilde{s}_3^{(q)}, \tilde{s}_4^{(q)}\}$ among the g value combinations, the generating rule of $\tilde{I}_q(t)$ and $\tilde{Q}_q(t)$ is $$\tilde{I}_q(t)=A_q \times sgn[\sin(2\pi f_s t+\phi_i)]$$

$$\tilde{Q}_q(t)=A'_q \times sgn[\sin(2\pi f_s t+\phi'_i)]$$

where, $$f_s = (f_1 - f_2)/2$$
$$A(\tilde{s}_1^{(q)}, \tilde{s}_2^{(q)}, \tilde{s}_3^{(q)}, \tilde{s}_4^{(q)}) = -\sqrt{(\sqrt{c_1}\tilde{s}_1^{(q)} + \sqrt{c_3}\tilde{s}_3^{(q)})^2 + (\sqrt{c_2}\tilde{s}_2^{(q)} - \sqrt{c_4}\tilde{s}_4^{(q)})^2}$$

$$A'(\tilde{s}_1^{(q)}, \tilde{s}_2^{(q)}, \tilde{s}_3^{(q)}, \tilde{s}_4^{(q)}) = \sqrt{(\sqrt{c_1}\tilde{s}_1^{(q)} - \sqrt{c_3}\tilde{s}_3^{(q)})^2 + (\sqrt{c_2}\tilde{s}_2^{(q)} + \sqrt{c_4}\tilde{s}_4^{(q)})^2}$$

$$\varphi(\tilde{s}_1^{(q)}, \tilde{s}_2^{(q)}, \tilde{s}_3^{(q)}, \tilde{s}_4^{(q)}) = -\text{atan2}(\sqrt{c_1}\tilde{s}_1^{(q)} + \sqrt{c_3}\tilde{s}_3^{(q)}, \sqrt{c_2}\tilde{s}_2^{(q)} - \sqrt{c_4}\tilde{s}_4^{(q)})$$

$$\varphi'(\tilde{s}_1^{(q)}, \tilde{s}_2^{(q)}, \tilde{s}_3^{(q)}, \tilde{s}_4^{(q)}) = \text{atan2}(\sqrt{c_2}\tilde{s}_2^{(q)} + \sqrt{c_4}\tilde{s}_4^{(q)}, \sqrt{c_1}\tilde{s}_1^{(q)} - \sqrt{c_3}\tilde{s}_3^{(q)})$$

$c_i$, i=1,2,3,4 is the power parameter of i-th baseband signal, wherein each group of the in-phase baseband waveform local replica $\tilde{I}_q(t)$ is multiplied by the receiver in-phase baseband signal SI(t) and receiver quadrature-phase baseband signal SQ(t) respectively, and the results are sent into the integration-dump filter for coherent integration with the duration of TI, then a q-th (q=1,2, ..., g) group of a first in-phase correlation value $corr1I_q$ and a first quadrature-phase correlation value $corr1Q_q$ are obtained; each group of the quadrature-phase baseband waveform local replica $\tilde{Q}_q(t)$, is multiplied by the receiver in-phase baseband signal SI(t) and receiver quadrature-phase baseband signal SQ(t) respectively, and the results are sent into the integration-dump filter for coherent integration with the duration of TI, then a q-th (q=1,2, ..., g) group of a second in-phase correlation value $corr2I_q$ and a second quadrature-phase correlation value $corr2Q_q$ are obtained;
combining the first in-phase correlation value $corr1I_q$ and the first quadrature-phase correlation value $corr1Q_q$, and combining the second in-phase correlation value $corr2I_q$ and the second quadrature-phase correlation value $corr2Q_q$, according to the following rule $$\begin{cases} I'_q = corr2I_q + corr1Q_q \\ Q'_q = corr1I_q - corr2Q_q \end{cases} ;$$

obtaining a q-th group of the in-phase combination correlation value $I'_q$ and quadrature-phase combination correlation value $Q'_q$;
selecting a group of $I'_q$; and $Q'_q$, $\sqrt{{I'_q}^2+{Q'_q}^2}$ of which is the maximum, among all the q groups, and then processing the selected group $I'_q$ and $Q'_q$ by using traditional acquisition method and tracking loop.

20. A method of multiplexing navigation satellite signal with constant envelope, comprising:
generating baseband spreading signals $s_i(t)$ i=1,2,3,4 for signal components, wherein carrier phases of $s_1(t)$ and $s_2(t)$ are orthogonal to each other, and carrier phases of $s_3$ and $s_4(t)$ are orthogonal to each other;
based on a drive of a driving clock with the frequency of $f_m$, multiplexing the baseband spreading signal $s_i(t)$, generating a multiplexed in-phase baseband waveform I(t) and a multiplexed quadrature-phase baseband waveform Q(t) according to the sign $s_{i,n} \in \{+1,-1\}$ of the value $s_i(t)$, during a time slot t,
wherein the frequency of $f_M$ is the least common multiple of the reciprocal of the minimum hold time of the sign of $s_i(t)$, so as to ensure that each phase-shifting point of the value of the $s_i(t)$(i=1,2,3,4) is synchronous to $f_m$, wherein n is an integer greater than or equal to zero, and the sign $s_{i,n} \in \{+1,-1\}$ of the value $s_i(t)$ keeps constant during the time slot t, $t \in [n/f_m,(n+1)/f_m)$,
based on a drive of a carrier driving clock with the frequency of $f_p = (f_1+_2)/2$, generating, using a carrier generator device, two carriers $\cos(2\pi f_p t)$ and $\sin(2\pi f_p t)$ with phases orthogonal to each other, and multiplying the two carriers by the multiplexed in-phase baseband waveform I(t) and the multiplexed quadrature-phase baseband waveform Q(t) respectively, and then making additive combination of the multiplied results, so as to obtain a signal $S_{RF}(t)$ in radio frequency with constant envelope, wherein $f_1$ is a central frequency of $s_1(t)$ and $s_2(t)$ of the signal with constant envelope modulated to radio frequency, and $f_2$ is a central frequency of $s_3(t)$ and $s_4(t)$ of the signal with constant envelope modulated to radio frequency.

21. The method as claimed in claim 20, where the multiplexed in-phase baseband waveform I(t) and the multiplexed quadrature-phase baseband waveform Q(t) are:

$$I(t)=A(s_{1,n},s_{2,n},s_{3,n},s_{4,n}) \times sgn[\sin(2\pi f_s t+\phi(s_{1,n},s_{2,n},s_{3,n},s_{4,n}))]$$

$$Q(t)=A'(s_{1,n},s_{2,n},s_{3,n},s_{4,n}) \times sgn[\sin(2\pi f_s t+\phi'(s_{1,n},s_{2,n},s_{3,n},s_{4,n}))]$$

wherein $f_s=(f_1-f_2)/2$, sgn stands for the sign function, $$\text{sgn}(x) = \begin{cases} +1, & x \geq 0 \\ -1, & x < 0 \end{cases}$$

and $$A(s_{1,n}, s_{2,n}, s_{3,n}, s_{4,n}) = \\ -\sqrt{\left(\sqrt{c_1}\, s_{1,n} + \sqrt{c_3}\, s_{3,n}\right)^2 + \left(\sqrt{c_2}\, s_{2,n} - \sqrt{c_4}\, s_{4,n}\right)^2}$$

$$A'(s_{1,n}, s_{2,n}, s_{3,n}, s_{4,n}) = \\ \sqrt{\left(\sqrt{c_1}\, s_{1,n} - \sqrt{c_3}\, s_{3,n}\right)^2 + \left(\sqrt{c_2}\, s_{2,n} + \sqrt{c_4}\, s_{4,n}\right)^2}$$

$$\varphi(s_{1,n}, s_{2,n}, s_{3,n}, s_{4,n}) = -\text{atan2}\left(\sqrt{c_1}\, s_{1,n} + \sqrt{c_3}\, s_{3,n}, \sqrt{c_2}\, s_{2,n} - \sqrt{c_4}\, s_{4,n}\right)$$

$$\varphi'(s_{1,n}, s_{2,n}, s_{3,n}, s_{4,n}) = \text{atan2}\left(\sqrt{c_2}\, s_{2,n} + \sqrt{c_4}\, s_{4,n}, \sqrt{c_1}\, s_{1,n} - \sqrt{c_3}\, s_{3,n}\right),$$

wherein atan2 is the four-quadrant arctangent function $$\text{atan2}(y, x) = \begin{cases} \arccos\left(\dfrac{y}{\sqrt{x^2+y^2}}\right), & x \geq 0, \sqrt{x^2+y^2} > 0 \\ -\arccos\left(\dfrac{y}{\sqrt{x^2+y^2}}\right), & x < 0 \\ 0, & \sqrt{x^2+y^2} = 0 \end{cases}.$$

22. A non-transitory storage medium, the non-transitory storage medium storing instructions executable by a processor to:
generate a first baseband signal $S_1$, a second baseband signal $S_2$, a third baseband signal $S_3$, and a fourth baseband signal $S_4$;
set, based on power parameters and values of the baseband signals, an amplitude and a phase of an in-phase baseband component and an amplitude and a phase of a quadrature-phase baseband component of a signal into which the first baseband signal $S_1$, the second baseband signal $S_2$, the third baseband signal $S_3$ and the fourth baseband signal $S_4$ are multiplexed, so as to generate a multiplexed signal with constant envelope; and
modulate the multiplexed signal with constant envelope to a radio frequency, so as to generate the navigation satellite signal,
wherein the first baseband signal $S_1$ and the second baseband signal $S_2$ are modulated to a first carrier frequency $f_1$ with carrier phases orthogonal to each other, and the third baseband signal $S_3$ and the fourth baseband signal S4 are modulated to a second carrier frequency $f_2$ with carrier phases orthogonal to each other.

23. The non-transitory storage medium of claim 22, wherein the power parameters are absolute powers of the baseband signals or relative powers of the baseband signals.

24. The non-transitory storage medium of claim 23, wherein the power parameters of any one, any two or any three of the baseband signals are zero, or the power parameter of each of the four baseband signals is non-zero.

25. The non-transitory storage medium of claim 22, wherein the storage medium further comprises non-transitory instructions executable to:
calculate the amplitude A(t) and the phase φ(t) of the in-phase baseband component I(t), and calculating the amplitude A'(t) and the phase φ'(t) of the quadrature-phase baseband component Q(t), based on the power parameters and values of the first baseband signal $S_1$, the second baseband signal $S_2$, the third baseband signal $S_3$ and the fourth baseband signal $S_4$;
generate, based on the calculated amplitude A(t) and phase φ(t), an in-phase baseband component I(t), which is expressed as $I(t)=A(t) \times sgn[\sin(2\pi f_s t + \phi(t))]$; and generate, based on the calculated amplitude A'(t) and the phase φ'(t), a quadrature-phase baseband component Q(t), which is expressed as $Q(t)=A'(t) \times sgn[\sin(2\pi f_s t + \phi'(t))]$, wherein $f_s = |f_1-f_2 51 /2$, sgn stands for the sign function, and $$\text{sgn}(x) = \begin{cases} +1, & x \geq 0 \\ -1, & x < 0 \end{cases}.$$

26. The non-transitory storage medium of claim 25, wherein the storage medium further comprises non-transitory instructions executable to:
calculate the amplitude A(t) and the phase φ(t) of the in-phase baseband component I(t), and calculating the amplitude A'(t) and the phase φ'(t) of the quadrature-phase baseband component Q(t), according to equations of:

$$A = -\sqrt{\left(\sqrt{c_1}\, s_1(t) + \sqrt{c_3}\, s_3(t)\right)^2 + \left(\sqrt{c_2}\, s_2(t) - \sqrt{c_4}\, s_4(t)\right)^2}$$

$$\varphi = -\text{atan2}\left(\sqrt{c_1}\, s_1(t) + \sqrt{c_3}\, s_3(t), \sqrt{c_2}\, s_2(t) - \sqrt{c_4}\, s_4(t)\right), \text{ and}$$

$$A' = \sqrt{\left(\sqrt{c_1}\, s_1(t) - \sqrt{c_3}\, s_3(t)\right)^2 + \left(\sqrt{c_2}\, s_2(t) + \sqrt{c_2}\, s_4(t)\right)^2}$$

$$\varphi' = \text{atan2}\left(\sqrt{c_2}\, s_2(t) + \sqrt{c_4}\, s_4(t), \sqrt{c_1}\, s_1(t) - \sqrt{c_3}\, s_3(t)\right),$$

wherein $s_i(t)$, i=1,2,3,4 stands for the i-th baseband signal $S_i$, $c_i$ stands for the power parameter of the i-th baseband signal $S_i$;
wherein atan2 is the four-quadrant arctangent function, $$\text{atan2}(y, x) = \begin{cases} \arccos\left(\dfrac{y}{\sqrt{x^2+y^2}}\right), & x \geq 0, \sqrt{x^2+y^2} > 0 \\ -\arccos\left(\dfrac{y}{\sqrt{x^2+y^2}}\right), & x < 0 \\ 0, & \sqrt{x^2+y^2} = 0 \end{cases}.$$

27. A non-transitory storage medium, the non-transitory storage medium storing instructions executable by a processor to:
receive a navigation satellite signal, wherein an amplitude and a phase of an in-phase baseband component and an amplitude and a phase of a quadrature-phase baseband component of an interim signal from which the navigation satellite signal is derived are set based on power parameters and values of baseband signals;
demodulate the navigation satellite signal so as to obtain an in-phase baseband component and a quadrature-phase baseband component of a multiplexed signal; and
determine a first baseband signal $S_1$, a second baseband signal $S_2$, a third baseband signal $S_3$ and a fourth baseband signal $S_4$, based on an amplitude and a phase of the in-phase baseband component and an amplitude and a phase of the quadrature-phase baseband component of the multiplexed signal.

28. The non-transitory storage medium of claim 27, wherein the storage medium further comprises non-transitory instructions executable to:

receive, filter and then amplify the navigation satellite signal, wherein a central frequency of the filtering is set at $(f_1+f_2)/2$;

convert a carrier frequency of the signal component to be processed to a corresponding intermediate frequency, and converting the signal component from analog to digital by sampling and quantizing the signal;

multiply the converted digital intermediate frequency signal by an in-phase carrier and a quadrature-phase carrier respectively, so as to obtain a receiver in-phase baseband signal SI(t) and a receiver quadrature-phase baseband signal SQ(t);

generate a spreading sequence of four signal component with spreading chip waveform assignment by using a digital signal processor based on the converted digital intermediate frequency signal, and according to all the possible value combinations of the binary baseband local signal replica of the four signal components, generating an in-phase baseband waveform local replica $\tilde{I}_q(t)$ and a quadrature-phase baseband waveform local replica $\tilde{Q}_q(t)$ corresponding to each combination, at each epoch, wherein the number of value combinations is noted as g, $g \leq 16$, and for a special case $S_i=\{\tilde{s}_1^{(q)}, \tilde{s}_2^{(q)}, \tilde{s}_3^{(q)}, \tilde{s}_4^{(q)}\}$ among the g value combinations, the generating rule of $\tilde{I}_q(t)$ and $\tilde{Q}_q(t)$ is $$\tilde{I}_q(t) = A_q \times sgn[\sin(2\pi f_s t + \phi_i)]$$

$$\tilde{Q}_q'(t) = A_q \times sgn[\sin(2\pi f_s t + \phi_i')]$$

where, $$f_s = (f_1 - f_2)/2$$

$$A(\tilde{s}_1^{(q)}, \tilde{s}_2^{(q)}, \tilde{s}_3^{(q)}, \tilde{s}_4^{(q)}) = \sqrt{(\sqrt{c_1}\tilde{s}_1^{(q)} + \sqrt{c_3}\tilde{s}_3^{(q)})^2 + (\sqrt{c_2}\tilde{s}_2^{(q)} - \sqrt{c_4}\tilde{s}_4^{(q)})^2}$$

$$A'(\tilde{s}_1^{(q)}, \tilde{s}_2^{(q)}, \tilde{s}_3^{(q)}, \tilde{s}_4^{(q)}) = \sqrt{(\sqrt{c_1}\tilde{s}_1^{(q)} - \sqrt{c_3}\tilde{s}_3^{(q)})^2 + (\sqrt{c_2}\tilde{s}_2^{(q)} + \sqrt{c_4}\tilde{s}_4^{(q)})^2}$$

$$\varphi(\tilde{s}_1^{(q)}, \tilde{s}_2^{(q)}, \tilde{s}_3^{(q)}, \tilde{s}_4^{(q)}) = -atan2(\sqrt{c_1}\tilde{s}_1^{(q)} + \sqrt{c_3}\tilde{s}_3^{(q)}, \sqrt{c_2}\tilde{s}_2^{(q)} - \sqrt{c_4}\tilde{s}_4^{(q)})$$

$$\varphi'(\tilde{s}_1^{(q)}, \tilde{s}_2^{(q)}, \tilde{s}_3^{(q)}, \tilde{s}_4^{(q)}) = atan2(\sqrt{c_2}\tilde{s}_2^{(q)} + \sqrt{c_4}\tilde{s}_4^{(q)}, \sqrt{c_1}\tilde{s}_1^{(q)} - \sqrt{c_3}\tilde{s}_3^{(q)})$$

$c_i, i=1,2,3,4$ is the power parameter of i-th baseband signal, wherein each group of the in-phase baseband waveform local replica $\tilde{I}_q(t)$ is multiplied by the receiver in-phase baseband signal SI(t) and receiver quadrature-phase baseband signal SQ(t) respectively, and the results are sent into the integration-dump filter for coherent integration with the duration of TI, then a q-th (q=1,2, ... , g) group of a first in-phase correlation value $corr1I_q$ and a first quadrature-phase correlation value $corr1Q_q$ are obtained; each group of the quadrature-phase baseband waveform local replica $\tilde{Q}_q(t)$ is multiplied by the receiver in-phase baseband signal SI(t) and receiver quadrature-phase baseband signal SQ(t) respectively, and the results are sent into the integration-dump filter for coherent integration with the duration of TI, then a q-th (q=1,2, ... , g) group of a second in-phase correlation value $corr2Q_q$, and a second quadrature-phase correlation value $corr2Q_q$ are obtained;

combining the first in-phase correlation value $corr1I_q$ and the first quadrature-phase correlation value $corr1Q_q$, and combining the second in-phase correlation value $corr2I_q$ and the second quadrature-phase correlation value $corr2Q_q$, according to the following rule $$\begin{cases} I'_q = corr2I_q + corr1Q_q \\ Q'_q = corr1I_q - corr2Q_q \end{cases} ;$$

obtaining a q-th group of the in-phase combination correlation value $I'_q$ and quadrature-phase combination correlation value $Q'_q$;

selecting a group of $I_q'$; and, $Q_q'$, $\sqrt{I'^2_q + Q'^2_q}$ of which is the maximum, among all the q groups, and then processing the selected group $I_q'$ and $Q_q'$ by using traditional acquisition method and tracking loop.

* * * * *